United States Patent
Wang

(10) Patent No.: US 12,425,196 B2
(45) Date of Patent: Sep. 23, 2025

(54) KEY NEGOTIATION METHOD AND RELATED DEVICE THEREOF

(71) Applicant: HUAWEI TECHNOLOGIES CO., LTD., Guangdong (CN)

(72) Inventor: Dehai Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 283 days.

(21) Appl. No.: 18/259,876

(22) PCT Filed: Dec. 14, 2021

(86) PCT No.: PCT/CN2021/137945
§ 371 (c)(1),
(2) Date: Jun. 29, 2023

(87) PCT Pub. No.: WO2022/143157
PCT Pub. Date: Jul. 7, 2022

(65) Prior Publication Data
US 2024/0073006 A1 Feb. 29, 2024

(30) Foreign Application Priority Data
Dec. 31, 2020 (CN) .......................... 202011639061.4

(51) Int. Cl.
*H04L 9/08* (2006.01)
*H04L 9/14* (2006.01)
*H04L 9/30* (2006.01)

(52) U.S. Cl.
CPC .......... *H04L 9/0838* (2013.01); *H04L 9/0861* (2013.01); *H04L 9/14* (2013.01); *H04L 9/30* (2013.01)

(58) Field of Classification Search
None
See application file for complete search history.

(56) References Cited

U.S. PATENT DOCUMENTS

| | | | | |
|---|---|---|---|---|
| 2008/0137863 | A1* | 6/2008 | Thomas | H04W 12/04 380/273 |
| 2012/0257757 | A1* | 10/2012 | Gessner | H04L 9/083 380/282 |
| 2019/0208416 | A1* | 7/2019 | Li | H04W 12/04 |
| 2022/0104011 | A1* | 3/2022 | Fischer | H04W 12/06 |

* cited by examiner

*Primary Examiner* — Bradley W Holder
(74) *Attorney, Agent, or Firm* — Fish & Richardson P.C.

(57) ABSTRACT

Example key negotiation methods and apparatus are described. One example method includes generating, by a first hub device, public key information and private key information of a first electronic device, where the first electronic device accesses a network by using the first hub device. The first hub device reports a first mode of the first electronic device to a cloud device, and obtains public key information of a second electronic device. The first hub device performs key negotiation with the second electronic device based on the private key information of the first electronic device and the public key information of the second electronic device, to generate a first shared key.

19 Claims, 24 Drawing Sheets

KEY NEGOTIATION METHOD AND RELATED DEVICE THEREOF

CROSS-REFERENCE TO RELATED APPLICATIONS

This application is a national stage of International Application No. PCT/CN2021/137945, filed on Dec. 14, 2021, which claims priority to Chinese Patent Application No. 202011639061.4 filed on Dec. 31, 2020. Both of the aforementioned applications are hereby incorporated by reference in their entireties.

TECHNICAL FIELD

This application relates to the field of smart home devices, and more specifically, to a key negotiation method and a related device thereof.

BACKGROUND

Currently, home devices in a home may include two types: a sensitive device and a non-sensitive device. A HiChain-related component may be integrated on the sensitive device. The HiChain-related component can generate related information about a public key and a private key of the device and perform key negotiation with another device, to improve information transmission security. Generally, the sensitive device with the HiChain-related component has larger memory than the non-sensitive device. However, because memory of the non-sensitive device is small, the HiChain-related component is not integrated on the non-sensitive device generally. Therefore, related information about a public key and a private key cannot be generated, and key negotiation with another device cannot be performed.

In some scenarios, a terminal device needs to control the home device by using the cloud. When the terminal device sends information to the sensitive device by using the cloud, because the sensitive device may perform key negotiation with a peer terminal device, the information sent by the terminal device to the sensitive device by using the cloud can be encrypted. When the terminal device sends information to the non-sensitive device by using the cloud, because the non-sensitive device does not have a key negotiation capability, the information sent by the terminal device to the sensitive device by using the cloud cannot be encrypted. In this case, the cloud may learn specific content of the information, resulting in a risk of information leakage; and the cloud may tamper with the information, which reduces security, cannot ensure accuracy of controlling the non-sensitive device by a user, and affects user experience.

SUMMARY

This application provides a key negotiation method and a related device thereof. In a process in which a first electronic device performs information transmission with a second electronic device by using a hub device, the first hub device may perform negotiation with the second electronic device, to generate a shared key, and encrypt information based on the key. This improves security of information transmission between the second electronic device and the first electronic device, ensures accuracy of controlling the first electronic device by a user, and improves user experience.

According to a first aspect, a key negotiation method is provided. The method includes: A first hub device generates public key information of a first electronic device and private key information of the first electronic device, where the first electronic device accesses a network by using the first hub device; the first hub device reports a first mode of the first electronic device to a cloud device, where the first mode includes that the first electronic device supports a key negotiation capability and the first electronic device is in a hub mode; the first hub device obtains public key information of a second electronic device, where the public key information is sent by the second electronic device based on the first mode of the first electronic device; and the first hub device performs key negotiation with the second electronic device based on the private key information of the first electronic device and the public key information of the second electronic device, to generate a first shared key. However, a HiChain-related component cannot be integrated on the first electronic device, so that the first electronic device cannot generate information related to a public key and a private key, and does not have the key negotiation capability. The first electronic device is in the hub mode.

According to the key negotiation method provided in the first aspect, in a process in which the first electronic device communicates with the second electronic device by using a hub device, the first hub device replaces the first electronic device, to generate the public key information and the private key information of the first electronic device, and replaces the first electronic device, to negotiate with the second electronic device, to generate the first shared key. Because the cloud cannot learn the shared key, the cloud cannot learn information transmitted between the second electronic device and the first hub device, and cannot tamper with the information. Therefore, security of information (for example, a control command) transmission between the second electronic device and the hub device is improved.

For example, the second electronic device and the first hub device may perform STS negotiation based on the public key information and the private key information of the first electronic device, and the public key information and the private key information of the second electronic device, to generate, according to an encryption algorithm (for example, an elliptic curve algorithm), the first shared key, and perform identity authentication based on public key information of the other party. Further, the second electronic device and the first hub device may separately store the first shared key.

For example, the first hub device may be an electronic device having a station to station key negotiation capability. In a possible implementation, the first hub device may be a routing device, for example, may be a wireless switch used in a wireless network, a Wi-Fi wireless router, an optical network terminal, a Wi-Fi wireless repeater or a CPE terminal, or a portable terminal hotspot. In another possible implementation, the first hub device may be a device having a routing function, for example, may be a wireless router, a smart television, a large-screen device, a smart air conditioner, a mobile phone, a tablet computer, a notebook computer, a large-screen television, a smart home appliance, a PDA, a POS, or a vehicle-mounted computer.

For example, the first electronic device may be a device that is not related to or is weakly related to user privacy, such as a smart lamp, a smart socket, or a smart refrigerator at home.

For example, the second electronic device used by a user may also be referred to as a control station device, and the control station device may be, for example, a mobile phone, a PDA, a notebook computer, or a wearable electronic device used by the user. The user controls the first electronic device at home by using the second electronic device.

For example, a communication connection based on a communication protocol such as Wi-Fi or Bluetooth may be established between the first electronic device and the first hub device.

In this application, the hub mode may be understood as that the first electronic device needs to communicate with a device (for example, the second electronic device) in an external network by using the first hub device. When the device in the external network needs to send information to the first electronic device, the device in the external network needs to first send the information to the first hub device, and then the first hub device forwards the information to the first electronic device. When the first electronic device needs to send information to the device in the external network, the first electronic device needs to first send the information to the first hub device, and then the first hub device forwards the information to the device in the external network.

In a possible implementation of the first aspect, the method further includes: The first hub device sends the first shared key to the first electronic device.

In a possible implementation of the first aspect, after the first hub device sends the first shared key to the first electronic device, the method further includes: The first hub device receives first information by using the cloud device, where the first information is encrypted by the second electronic device based on the first shared key; and the first hub device sends the first information to the first electronic device. In this implementation, information sent by the second electronic device to the first electronic device may be encrypted on the second electronic device based on the shared key, and encrypted information is transmitted to the hub device by using the cloud. Because the cloud cannot learn the shared key, the cloud cannot learn specific content of the information, and cannot tamper with the information. In this way, security of the information (for example, the control command) transmission between the second electronic device and the hub device is improved, accuracy of controlling the first electronic device by the user is ensured, and user experience is improved. In addition, when receiving the first information that is encrypted based on the first shared key, the first hub device does not need to decrypt the first information, and directly sends the first information to the first electronic device. This reduces resource overheads of the first hub device and ensures security of transmission of the first information.

In a possible implementation of the first aspect, the method further includes: The first hub device receives first information by using the cloud device, where the first information is encrypted by the second electronic device based on the first shared key; the first hub device decrypts the first information based on the first shared key, to obtain second information; and the first hub device sends the second information to the first electronic device. In this implementation, when receiving the first information that is encrypted based on the first shared key, the first hub device decrypts the first information, to obtain the second information, and sends the second information to the first electronic device. This improves information transmission efficiency.

In a possible implementation of the first aspect, before the first hub device generates the public key information of the first electronic device and the private key information of the first electronic device, the method further includes: The first hub device receives registration information sent by the first electronic device, where the registration information includes a first identification code of the first electronic device, and information that the first electronic device does not have the key negotiation capability. That the first electronic device does not have the key negotiation capability means that the first electronic device cannot generate the public key information and the private key information of the first electronic device, and does not have the station to station key negotiation capability.

For example, the first identification code of the first electronic device may include a PIN of the first electronic device.

For example, the first electronic device may access the first hub device in an authcode manner.

Optionally, the registration information may further include an ID of the first electronic device, and the like.

In a possible implementation of the first aspect, that the first hub device obtains public key information of a second electronic device includes: The first hub device performs key negotiation with the second electronic device based on the first identification code, to generate a second shared key; the first hub device receives the public key information of the second electronic device by using the cloud device, where the public key information of the second electronic device is encrypted by the second electronic device based on the second shared key; and the first hub device decrypts the public key information of the second electronic device based on the second shared key. In this implementation, the public key information of the second electronic device is transmitted based on the second shared key generated through negotiation between the first hub device and the second electronic device, so that security and efficiency of transmitting the public key information of the second electronic device are improved.

For example, the second electronic device and the first hub device may perform SPEKE negotiation based on the PIN of the first electronic device, to generate the second shared key, and separately store the second shared key.

In a possible implementation of the first aspect, the method further includes: The first hub device sends the public key information of the first electronic device to the second electronic device by using the cloud device, and the public key information of the first electronic device is encrypted by the first hub device based on the second shared key. In this implementation, the public key information of the first electronic device is transmitted based on the second shared key generated through negotiation between the first hub device and the second electronic device, so that security and efficiency of transmitting the public key information of the first electronic device are improved.

In a possible implementation of the first aspect, before the first hub device sends the public key information of the first electronic device to the second electronic device by using the cloud device, the method further includes: The first hub device determines, based on first registration information, that the first electronic device does not have the key negotiation capability.

In a possible implementation of the first aspect, before the first hub device generates the public key information of the first electronic device and the private key information of the first electronic device, the method further includes: The first hub device receives a hub probe packet sent by the first electronic device; and the first hub device sends, to the first electronic device, a response packet responding to the hub probe packet, where the response packet is used to enable the first electronic device to access the network by using the first hub device. In this implementation, when an active hub device is unavailable, the first hub device (a standby hub device) may send the hub probe packet to the first electronic device, so that the first electronic device accesses the first hub device, and then communicates with the second electronic device in the external network by using the first hub device. This ensures stability and efficiency of information transmission.

According to a second aspect, a key negotiation method is provided. The method is applied to a key negotiation system, and the system includes a first hub device, a first electronic device, a second electronic device, and a cloud device. The method includes: The first electronic device is communicatively connected to the cloud device by using the first hub device. The first hub device generates public key information of the first electronic device and private key information of the first electronic device, and the first electronic device accesses a network by using the first hub device. The first hub device reports a first mode of the first electronic device to the cloud device, and the first mode includes that the first electronic device supports a key negotiation capability and the first electronic device is in a hub mode. The second electronic device obtains the first mode of the first electronic device from the cloud device. The second electronic device sends public key information of the second electronic device to the first hub device by using the cloud device. The first hub device obtains the public key information of the second electronic device. The first hub device sends the public key information of the first electronic device to the second electronic device by using the cloud device. The second electronic device obtains the public key information of the first electronic device. The first hub device and the second electronic device perform key negotiation based on the public key information of the second electronic device and the public key information of the first electronic device, to generate a first shared key. However, a HiChain-related component cannot be integrated on the first electronic device, so that the first electronic device cannot generate information related to a public key and a private key, and does not have the key negotiation capability.

According to the method provided in the second aspect, in a process in which the first electronic device communicates with the first electronic device by using a hub device, the first hub device replaces the first electronic device, to generate the public key information and the private key information of the first electronic device, and replaces the first electronic device, to negotiate with the second electronic device, to generate the first shared key. Because the cloud cannot learn the shared key, the cloud cannot learn information transmitted between the second electronic device and the hub device, and cannot tamper with the information. Therefore, security of information (for example, a control command) transmission between the second electronic device and the hub device is improved.

For example, the second electronic device and the first hub device may perform STS negotiation based on the public key information and the private key information of the first electronic device, and the public key information and the private key information of the second electronic device, to generate, according to an encryption algorithm (for example, an elliptic curve algorithm), the first shared key, and perform identity authentication based on public key information of the other party. Further, the second electronic device and the first hub device may separately store the first shared key.

For example, the first hub device may be an electronic device having a station to station key negotiation capability. In a possible implementation, the first hub device may be a routing device, for example, may be a wireless switch used in a wireless network, a Wi-Fi wireless router, an optical network terminal, a Wi-Fi wireless repeater or a CPE terminal, or a portable terminal hotspot. In another possible implementation, the first hub device may be a device having a routing function, for example, may be a wireless router, a smart television, a large-screen device, a smart air conditioner, a mobile phone, a tablet computer, a notebook computer, a large-screen television, a smart home appliance, a PDA, a POS, or a vehicle-mounted computer.

For example, the first electronic device may be a device that is not related to or is weakly related to user privacy, such as a smart lamp, a smart socket, or a smart refrigerator at home.

For example, the second electronic device used by a user may also be referred to as a control station device, and the control station device may be, for example, a mobile phone, a PDA, a notebook computer, or a wearable electronic device used by the user. The user controls the first electronic device at home by using the second electronic device.

In a possible implementation of the second aspect, the method further includes: The second electronic device sends first information to the first hub device by using the cloud device, where the first information is encrypted by the second electronic device based on the first shared key; the cloud device forwards the first information to the first hub device based on the first mode; the first hub device decrypts the first information based on the first shared key, to obtain second information; and the first hub device sends the second information to the first electronic device. In this implementation, information sent by the second electronic device to the first electronic device may be encrypted on the second electronic device based on the shared key, and encrypted information is transmitted to the hub device by using the cloud. Because the cloud cannot learn the shared key, the cloud cannot learn specific content of the information, and cannot tamper with the information. In this way, security of the information (for example, a control command) transmission between the second electronic device and the hub device is improved, accuracy of controlling the first electronic device by a user is ensured, and user experience is improved.

In a possible implementation of the second aspect, the method further includes: The second electronic device sends first information to the first hub device by using the cloud device, where the first information is encrypted by the second electronic device based on the first shared key; the cloud device forwards the first information to the first hub device based on the first mode; the first hub device sends the first shared key to the first electronic device; and the first hub device sends the first information to the first electronic device. In this implementation, because the cloud cannot learn the shared key, the cloud cannot learn specific content of the information, and cannot tamper with the information. In this way, security of the information (for example, the control command) transmission between the second electronic device and the hub device is improved, and information transmission efficiency is improved.

In a possible implementation of the second aspect, before the first hub device generates the public key information of the electronic device and the private key information of the electronic device, the method further includes: The first electronic device sends first registration information to the first hub device, and the first registration information includes that the first electronic device does not have the key negotiation capability. Before the first hub device sends the public key information of the first electronic device to the second electronic device by using the cloud device, the method further includes: The first hub device determines, based on the first registration information, that the first electronic device does not have the key negotiation capability.

In a possible implementation of the second aspect, the first mode further includes: The first electronic device accesses a network by using the first hub device. That the second electronic device sends public key information of the second electronic device to the first hub device by using the cloud device includes: The second electronic device sends the public key information of the second electronic device to the cloud device; and the cloud device forwards the public key information of the second electronic device to the first hub device based on the first mode.

In a possible implementation of the second aspect, before the first hub device generates the public key information of the electronic device and the private key information of the electronic device, the method further includes: The first electronic device sends second registration information to the first hub device, and the second registration information further includes a first identification code of the first electronic device; the second electronic device obtains the first identification code; and the second electronic device and the first hub device perform key negotiation based on the first identification code, to generate a second shared key. That the second electronic device sends public key information of the second electronic device to the first hub device by using the cloud device includes: The second electronic device sends the public key information of the second electronic device to the first hub device by using the cloud device, and the public key information of the second electronic device is encrypted based on the second shared key; the cloud device forwards the public key information of the second electronic device to the first hub device; and the first hub device decrypts the public key information of the second electronic device based on the second shared key, to obtain the public key information of the second electronic device. That the first hub device sends the public key information of the first electronic device to the second electronic device by using the cloud device includes; The first hub device sends the public key information of the first electronic device to the second electronic device by using the cloud device, and the public key information of the first electronic device is encrypted based on the second shared key; the cloud device forwards the public key information of the first electronic device to the second electronic device; and the second electronic device decrypts the public key information of the first electronic device based on the second shared key, to obtain the public key information of the first electronic device. In this implementation, the first hub device and the second electronic device may perform key negotiation, to generate the second shared key, and exchange the public key information of the second electronic device and the public key information of the first electronic device based on the second shared key, so that security and efficiency of transmitting the public key information are improved.

For example, the first identification code of the first electronic device may include a PIN of the first electronic device.

For example, the second electronic device and the first hub device may perform SPEKE negotiation based on the PIN of the first electronic device, to generate the second shared key, and separately store the second shared key.

In a possible implementation of the second aspect, the system further includes a second hub device, the first electronic device and the first hub device are in a heartbeat connection, and the method further includes: The first electronic device determines, through the heartbeat connection, that the first hub device is unavailable; the first electronic device disconnects from the first hub device; the first electronic device sends a hub probe packet to the second hub device; and the second hub device sends, to the first electronic device, a second response packet responding to the hub probe packet, where the second response packet is used to enable the first electronic device to access the network by using the second hub device. In this implementation, in a scenario in which there is the first hub device (the active hub device) and the second hub device (the standby hub device), when a link between the first hub device and the first electronic device is broken, the first electronic device re-accesses or re-registers with the second hub device, and the control command that is transmitted between the second hub device and the second electronic device by using the cloud and that is for the first electronic device is encrypted based on the shared key. The shared key is generated through negotiation performed by the first hub device instead of the first electronic device. Alternatively, the shared key is generated through negotiation performed between the second hub device and the second electronic device. Because the cloud cannot learn the shared key, the cloud cannot learn the control command, and cannot tamper with the control command. In this way, security of control command transmission is improved. In addition, control command transmission reliability is ensured, and control command transmission efficiency is improved.

For example, that the first hub device is in an unavailable state includes: The first hub device is powered off, is moved out, or is faulty, a link between the first hub device and the cloud is broken, or the link between the first hub device and the first electronic device is broken.

In a possible implementation of the second aspect, the system further includes a third electronic device, the third electronic device is communicatively connected to the second electronic device, and the method further includes: The third electronic device generates public key information of the third electronic device and private key information of the third electronic device; the second electronic device sends the public key information of the first electronic device to the third electronic device; the third electronic device sends the public key information of the third electronic device to the second electronic device; the second electronic device uploads the public key information of the third electronic device to the cloud device; the first hub device obtains the public key information of the third electronic device from the cloud device; and the first hub device and the third electronic device perform key negotiation based on the public key information of the third electronic device and the public key information of the first electronic device, to generate a third shared key. The second electronic device (the primary control station device) and the third electronic device (the secondary control station device) respectively correspond to different accounts. Therefore, the second electronic device and the third electronic device respectively correspond to different public key information, and respectively correspond to different private key information.

In this implementation, when the user switches from the second electronic device to the third electronic device, to control the first electronic device, the third electronic device and the first hub device may perform station to station key negotiation, to generate the third shared key. After the user switches the electronic device, accuracy of controlling the first electronic device by the user is ensured, and user experience is improved.

In a possible implementation of the second aspect, the method further includes: The third electronic device sends third information to the first hub device by using the cloud device, where the third information is encrypted by the third electronic device based on the third shared key; the cloud device forwards the third information to the first hub device based on the first mode; the first hub device decrypts the third information based on the third shared key, to obtain fourth information; and the first hub device sends the fourth information to the first electronic device. In this implementation, when the third electronic device sends information to the first electronic device, the information may be encrypted on the third electronic device based on the third shared key, and encrypted information is transmitted to the first hub device by using the cloud. In this way, information transmission security is improved. After the user switches the electronic device, accuracy of controlling the first electronic device by the user is ensured, and user experience is improved.

In a possible implementation of the second aspect, the method further includes: The second electronic device and the third electronic device perform key negotiation, to generate a fourth shared key. That the second electronic device sends the public key information of the first electronic device to the third electronic device includes: The second electronic device sends the public key information of the first electronic device to the third electronic device, where the public key information of the first electronic device is encrypted based on the fourth shared key; and the third electronic device decrypts the public key information of the first electronic device based on the fourth shared key, to obtain the public key information of the first electronic device. That the third electronic device sends the public key information of the third electronic device to the second electronic device includes: The third electronic device sends the public key information of the third electronic device to the second electronic device, where the public key information of the third electronic device is encrypted based on the fourth shared key; and the second electronic device decrypts the public key information of the third electronic device based on the fourth shared key, to obtain the public key information of the third electronic device. In this implementation, the public key information of the first electronic device and the public key information of the third electronic device are exchanged based on the fourth shared key generated through negotiation between the second electronic device and the third electronic device, so that security and efficiency of transmitting the public key information are improved.

In a possible implementation of the second aspect, the method further includes a fourth electronic device, the fourth electronic device is communicatively connected to the second electronic device, and the method further includes: The second electronic device sends private key information of the second electronic device and the public key information of the second electronic device to the fourth electronic device; the second electronic device uploads the public key information of the first electronic device to the cloud device; the fourth electronic device obtains the public key information of the first electronic device from the cloud device; and the first hub device and the fourth electronic device perform key negotiation based on the public key information of the second electronic device and the public key information of the first electronic device, to generate a fifth shared key. The second electronic device (the primary control station device) and the fourth electronic device (the secondary control station device) correspond to the same account. Therefore, the second electronic device and the fourth electronic device separately correspond to the same public key information, and separately correspond to the same private key information.

In this implementation, when the user switches the second electronic device to the fourth electronic device, to control the first electronic device, the third electronic device and the first hub device may perform station to station key negotiation, to generate the fifth shared key. After the user switches the electronic device, accuracy of controlling the first electronic device by the user is ensured, and user experience is improved.

In a possible implementation of the second aspect, the method further includes: The fourth electronic device sends fifth information to the first hub device by using the cloud device, where the fifth information is encrypted by the fourth electronic device based on the fifth shared key; the cloud device forwards the fifth information to the first hub device based on the first mode; the first hub device decrypts the fifth information based on the fifth shared key, to obtain sixth information; and the first hub device sends the sixth information to the first electronic device. In this implementation, when the fourth electronic device sends information to the first electronic device, the information may be encrypted on the fourth electronic device based on the fifth shared key, and encrypted information is transmitted to the first hub device by using the cloud. In this way, information transmission security is improved. After the user switches the electronic device, accuracy of controlling the first electronic device by the user is ensured, and user experience is improved.

For example, the second electronic device may send, to the fourth electronic device in a manner of a trust chain, the private key information and the public key information corresponding to an account of the second electronic device.

According to a third aspect, a communication apparatus is provided. The apparatus includes units configured to perform the steps in any one of the first aspect or the possible implementations of the first aspect.

According to a fourth aspect, a communication apparatus is provided. The communication apparatus includes at least one processor and a memory. The processor is coupled to the memory, the memory stores program instructions, and when the program instructions stored in the memory are executed by the processor, the method in any one of the first aspect or the possible implementations of the first aspect is performed.

According to a fifth aspect, a communication apparatus is provided. The communication apparatus includes at least one processor and an interface circuit, and the at least one processor is configured to perform the method in any one of the first aspect or the possible implementations of the first aspect.

According to a sixth aspect, a hub device is provided. The hub device includes any communication apparatus provided in the third aspect, the fourth aspect, or the fifth aspect.

According to a seventh aspect, a computer program product is provided. The computer program product includes a computer program. When the computer program is executed by a processor, the computer program is used to perform the method in any one of the first aspect or the possible implementations of the first aspect, or perform the method in any one of the second aspect or the possible implementations of the second aspect.

According to an eighth aspect, a computer-readable storage medium is provided. The computer-readable storage medium stores a computer program. When the computer program is executed, the computer program is used to perform the method in any one of the first aspect or the possible implementations of the first aspect, or perform the method in any one of the second aspect or the possible implementations of the second aspect.

According to a ninth aspect, a chip is provided. The chip includes a processor, configured to invoke a computer program from a memory and run the computer program, so that a communication device on which the chip is installed performs the method in any one of the first aspect or the possible implementations of the first aspect, or the method in any one of the second aspect or the possible implementations of the second aspect.

This application provides the key negotiation method and the related device thereof. In a process in which the first electronic device communicates with the second electronic device by using the hub device, the hub device replaces the first electronic device, to perform negotiation with the second electronic device, and replaces the first electronic device, to generate a shared key. Information sent by the second electronic device to the first electronic device may be encrypted on the second electronic device based on the shared key, and encrypted information is transmitted to the hub device by using the cloud. Because the cloud cannot learn the shared key, the cloud cannot learn specific content of the information, and cannot tamper with the information. In this way, security of the information (for example, a control command) transmission between the second electronic device and the hub device is improved, accuracy of controlling the first electronic device by the user is ensured, and user experience is improved.

DESCRIPTION OF EMBODIMENTS

Figure 1:
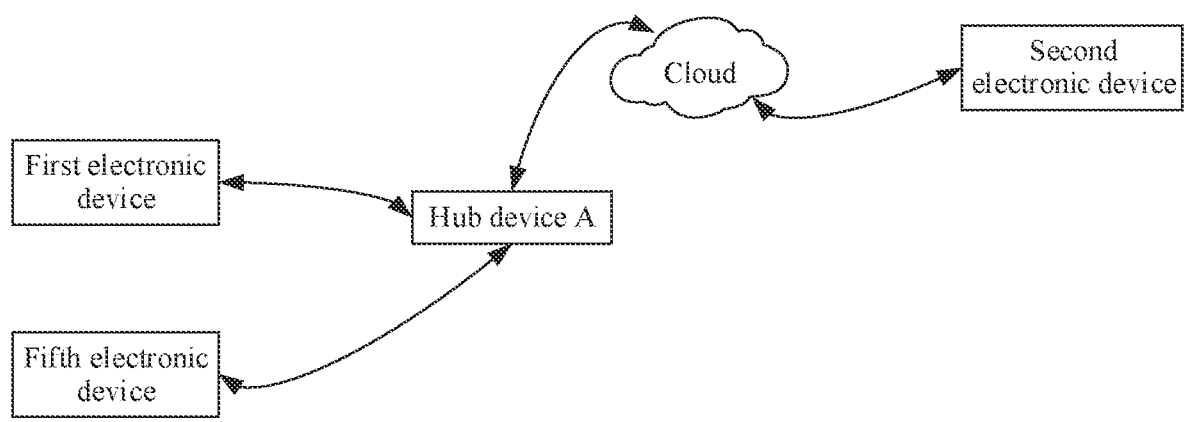
FIG. 1 is a schematic diagram of an example of a scenario in which a user controls a fifth electronic device and a first electronic device at home by using a hub device.

The following describes technical solutions of this application with reference to accompanying drawings.

In descriptions of embodiments of this application, unless otherwise specified, "I" means "or". For example, A/B may represent A or B. In this specification, "and/or" describes only an association relationship between associated objects and represents that three relationships may exist. For example. A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more than two.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory. EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry an instruction and/or data.

The technical solution of embodiments of this application may be used in various communication systems, for example, a global system for mobile communications (Global System of Mobile communication, GSM) system, a code division multiple access (Code Division Multiple Access. CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communication system, a 5th generation (5th Generation, 5G) system, or a new radio (New Radio, NR) system.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry an instruction and/or data.

As a proxy communication egress of a home device at home, a hub converges a risk of exposing the home device at home to a network, and also provides a user with an extensible security node for controlling and managing the home device. This provides a stronger security protection capability for the home device. In this way, the cloud cannot control a first device in the home device, and cannot perceive a specific operation performed by the user on the first device. Currently, a hub service is deployed only on specific devices at home, and these devices may be referred to as hub devices. For example, the hub device may be a Huawei router, a Huawei vision, a Huawei artificial intelligence (artificial intelligence, AI) sound box, or the like at home.

It should be understood that, in embodiments of this application, the hub device may be an electronic device having a station to station key negotiation capability. In a possible implementation, the hub device may be a routing device, for example, may be a wireless switch used in a wireless network, a Wi-Fi wireless router, an optical network terminal, a Wi-Fi wireless repeater or a customer premise equipment (customer premise equipment, CPE) terminal, or a portable terminal hotspot. In another possible implementation, the hub device may be a device having a routing function, for example, may be a wireless router, a smart television, a large-screen device, a smart air conditioner, a mobile phone, a tablet computer, a notebook computer, a large-screen television, a smart home device, a personal digital assistant (personal digital assistant, PDA), a point of sale (point of sale, POS), or a vehicle-mounted computer.

It should be further understood that, in embodiments of this application, there may be a plurality of hub devices. In the plurality of hub devices, one of the hub devices is an active hub device, and other hub devices are standby hub devices. When the active hub device is faulty and cannot work normally, a standby hub device may replace the active hub device, to work normally.

In embodiments of this application, the home devices at home may include a sensitive device and a non-sensitive device. A HiChain-related component may be integrated on the sensitive device. The HiChain-related component can generate related information about a public key and a private key of the sensitive device. The sensitive device has larger memory than the non-sensitive device. However, because memory of the non-sensitive device is small, the HiChain-related component cannot be integrated on the non-sensitive device. Therefore, the non-sensitive device cannot generate related information about a public key and a private key. For example, the sensitive device may be a device that is related to user privacy, such as a camera, a cordless phone, a personal digital assistant (personal digital assistant, PDA), a notebook computer, or a printer at home. The non-sensitive device may be a device that is not related to or is weakly related to user privacy, such as a smart lamp, a smart socket, or a smart refrigerator at home. This is not limited in embodiments of this application.

Currently, the user controls the sensitive device at home by using the hub device. The user sends a control command to the sensitive device by using a used electronic device, the control command is sent to the hub device by using the cloud (for example, a smart home cloud), and the hub device forwards the control command (or may be referred to as control information) to the sensitive device, to implement control of the user on the sensitive device. The control command sent by the user to the sensitive device by using the hub device is authenticated and encrypted based on station to station. To be specific, the control command is encrypted between an electronic device used by the user (for example, an application (application, APP) on a mobile phone used by the user) and the sensitive device. The cloud only forwards the control command, and cannot perceive specific content of the control command. This can effectively prevent the control command from being tampered with, and avoid information leakage and spoofing caused by exposure of the control command to the cloud, a cloud service operator can prove innocence, and security is improved.

It should be understood that, in embodiments of this application, the electronic device used by the user may be a device that communicates with the cloud device. For example, the electronic device may be a mobile phone, a PDA, a notebook computer, a wearable electronic device, or the like used by the user. The user may use the electronic device to control the sensitive device and the non-sensitive device, that is, use the electronic device to send information to the non-sensitive device and the sensitive device by using the cloud and the hub device.

In the following description, the non-sensitive device is referred to as a first electronic device, the electronic device used by the user is referred to as a second electronic device, and the sensitive device is referred to as a fifth electronic device. In this embodiment of this application, the second electronic device used by the user may also be referred to as a control station device, and the control station device may be, for example, a mobile phone, a PDA, a notebook computer, or a wearable electronic device used by the user.

FIG. 1 is a schematic diagram of an example of a scenario in which a user controls a fifth electronic device and a first electronic device at home by using a hub device. As shown in FIG. 1, a hub device (for differentiation, referred to as a hub device A) may manage a plurality of fifth electronic devices and a plurality of first electronic devices. FIG. 1 shows a scenario in which there is one fifth electronic device and one first electronic device. A control command of the user for the fifth electronic device is transmitted to the hub device A through a communication link between the hub device A and a second electronic device (for example, a mobile phone) used by the user, and then is sent to the fifth electronic device by using the hub device A, so that the user controls the fifth electronic device. The communication link between the hub device A and the second electronic device used by the user may be a cloud transmission link established based on a cellular network protocol, for example, a communication link established by using a 5G or 4G communication technology.

Figure 2A:
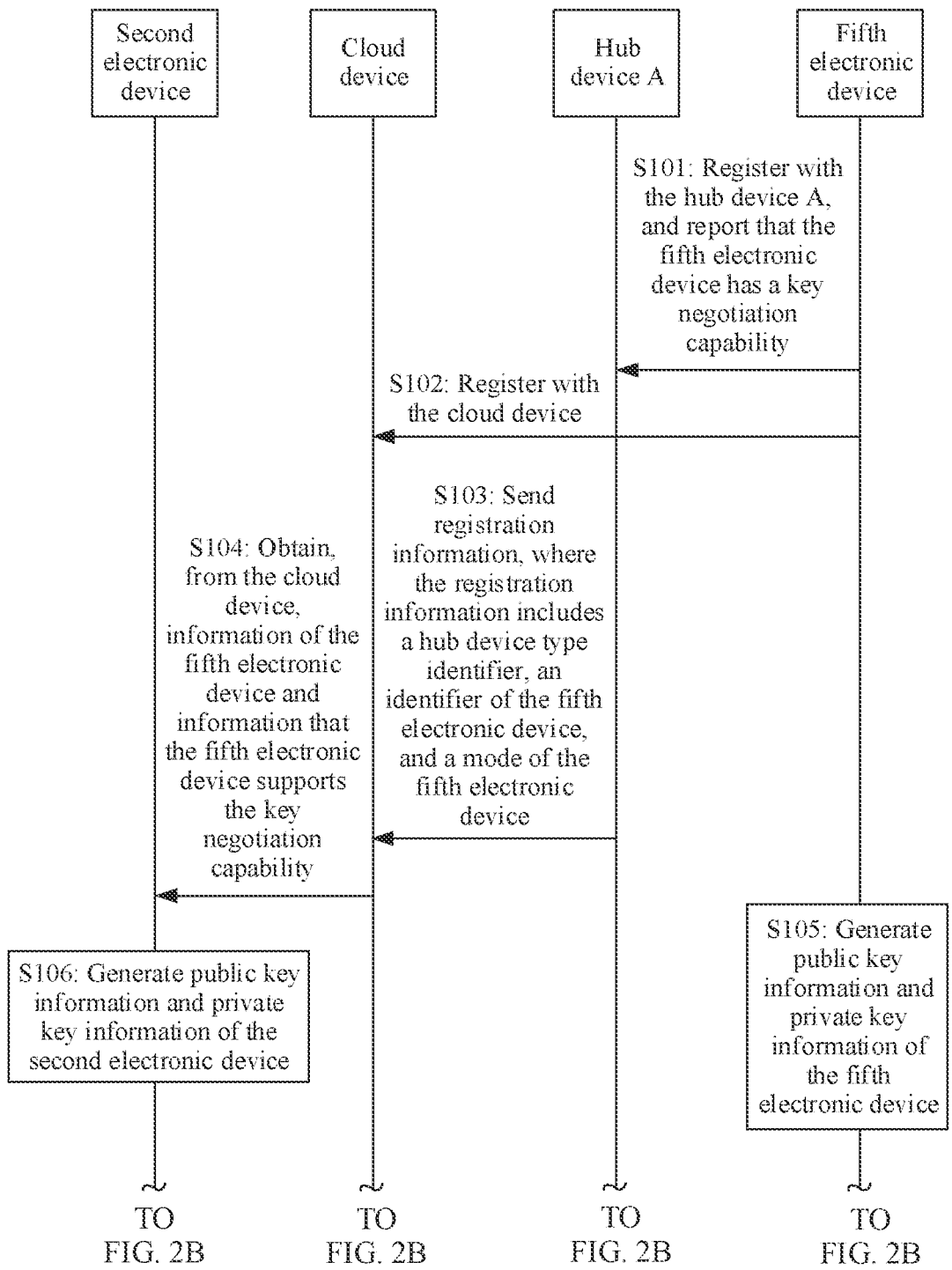
FIG. 2A to FIG. 2C are a schematic flowchart of a method in which a user controls a fifth electronic device by using a second electronic device in a conventional technology.
Figure 2B:
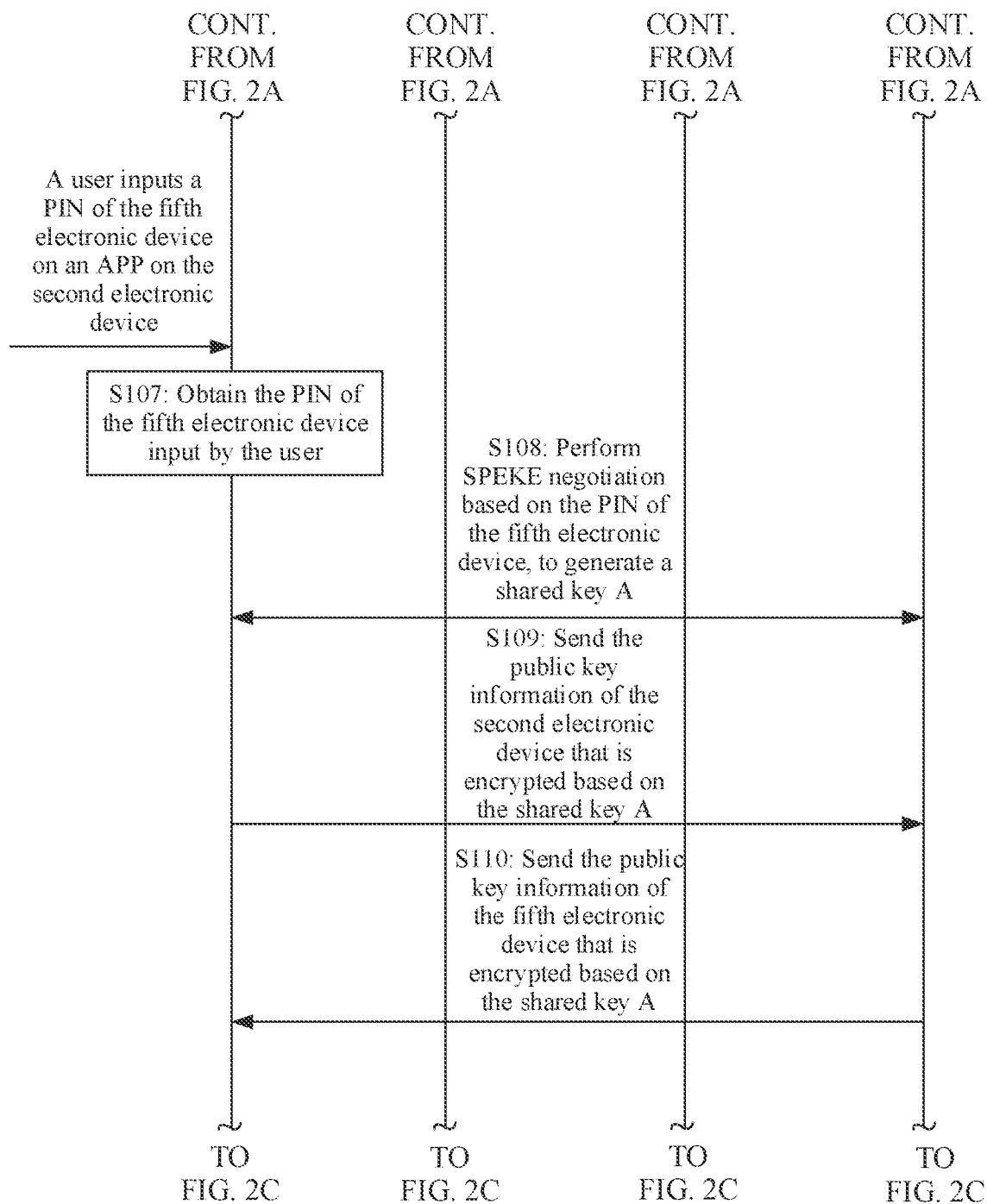
Figure 2C:
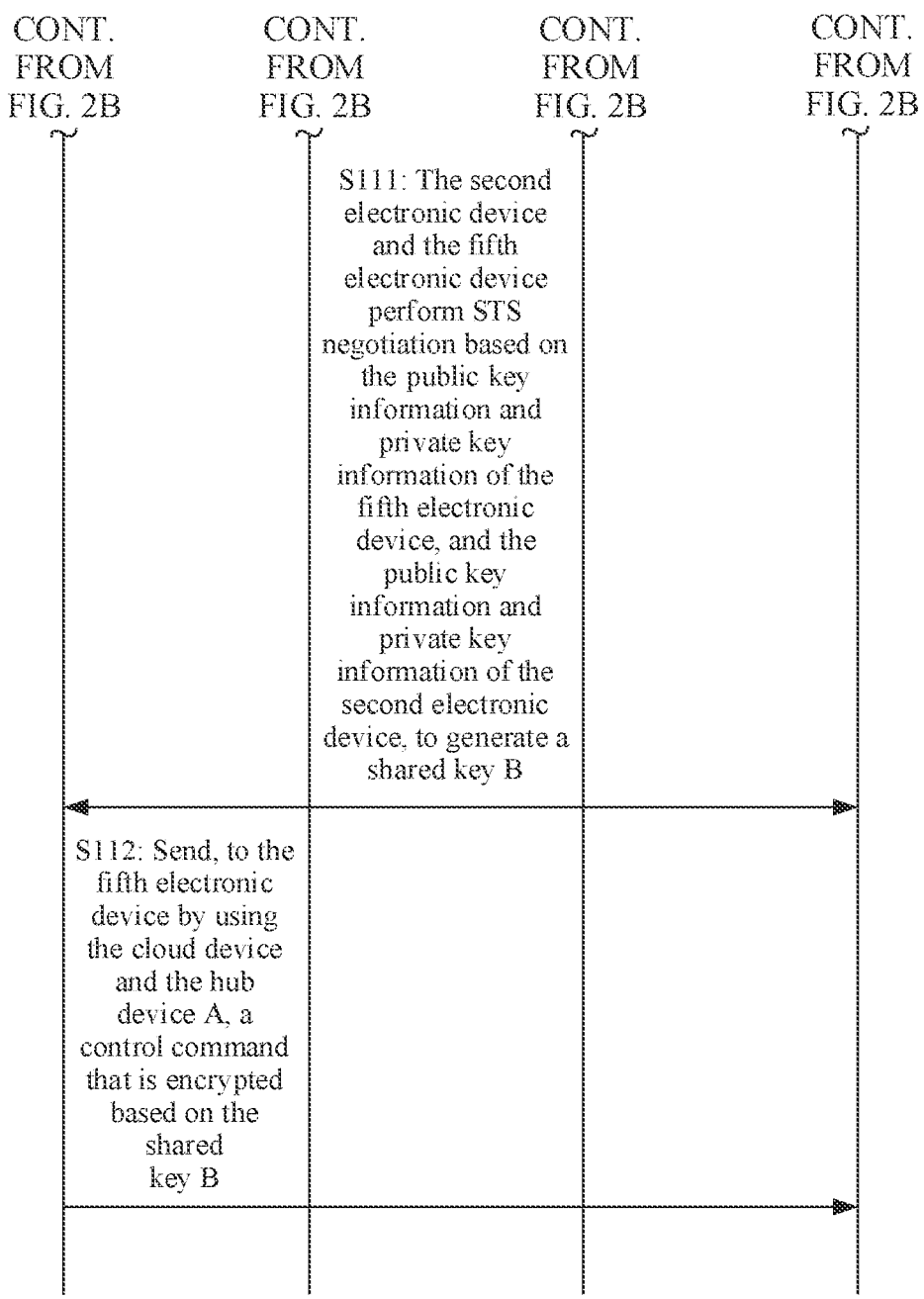

FIG. 2A to FIG. 2C are a schematic flowchart of a method 100 in which the user controls the fifth electronic device by using the second electronic device in the scenario shown in FIG. 1.

As shown in FIG. 2A to FIG. 2C, in S101, the fifth electronic device (for example, a fifth electronic device 1) at user's home first registers with the hub device A, and establishes a communication connection to the hub device A. For example, a communication connection based on a communication protocol such as Wireless Fidelity (wireless fidelity. Wi-Fi) or Bluetooth may be established between the fifth electronic device and the hub device A. In addition, in S101, the fifth electronic device may further report to the hub device A that the fifth electronic device has a key negotiation capability, where the key negotiation capability may be understood as that the fifth electronic device has a station to station key negotiation capability and a capability of generating public key information and private key information.

S102: The fifth electronic device at user's home registers with or accesses a cloud device, for example, reports information such as an identifier and a device ID of the fifth electronic device to the cloud device.

In S103, the hub device A sends registration information to the cloud device, and registers with the cloud device (in this embodiment of this application, the cloud device may be referred to as a home cloud). The registration information includes a hub device type identifier, the identifier of the fifth electronic device, and a mode of the fifth electronic device. The mode of the fifth electronic device includes that the fifth electronic device is in a hub mode and that the fifth electronic device supports a station to station key negotiation capability. The hub device type identifier indicates that the device is the hub device. In this embodiment of this application, the hub mode may be understood as that the fifth electronic device needs to communicate with a device in an external network by using the hub device A. When the device (for example, the second electronic device) in the external network needs to send information to the fifth electronic device, the device in the external network needs to first send the information to the hub device A. and then the hub device A forwards the information to the fifth electronic device. When the fifth electronic device needs to send information to the device in the external network, the fifth electronic device needs to first send the information to the hub device A, and then the hub device A forwards the information to the device in the external network. In S101, the hub device A has learned that the fifth electronic device has the key negotiation capability. Therefore, the hub device A may determine that the hub device A does not need to replace the first electronic device, to perform key negotiation, that is, the hub device A only needs to perform information forwarding.

S104: The second electronic device obtains, from the cloud device, information of the fifth electronic device and information that the fifth electronic device supports the station to station key negotiation capability. For example, the information of the fifth electronic device includes that the fifth electronic device is in the hub mode.

In S105, the fifth electronic device generates the public key information and the private key information of the fifth electronic device.

In S106, the second electronic device generates public key information and private key information of the second electronic device.

In S107, the second electronic device obtains a personal identification number (personal identification number, PIN) of the fifth electronic device that is input by the user on an APP on the second electronic device.

In S108, the second electronic device and the fifth electronic device perform simple password exponential key exchange (simple password exponential key exchange, SPEKE) negotiation based on the PIN of the fifth electronic device, to generate a shared key A. For a process in which the second electronic device and the fifth electronic device perform SPEKE negotiation based on the PIN of the fifth electronic device, to generate the shared key A, refer to a specific procedure shown in FIG. 6 in the following figures. Details are not described herein again.

In S109, the second electronic device performs public key exchange based on the generated shared key A. After determining that the fifth electronic device is in the hub mode, the second electronic device performs an operation of adding the fifth electronic device to a device security protection list, and requests to perform public key exchange with the fifth electronic device. The second electronic device encrypts the public key information of the second electronic device based on the shared key A, to obtain a public key exchange packet, and the public key exchange packet carries the identifier of the fifth electronic device. The second electronic device first sends the public key exchange packet to the cloud device, then the cloud device forwards the public key exchange packet to the hub device A. and the hub device A forwards the public key exchange packet to the fifth electronic device. After receiving the public key exchange packet, the fifth electronic device decrypts the public key exchange packet based on the shared key A. If it is determined that a device identifier carried in the packet is the identifier of the fifth electronic device, the fifth electronic device obtains the public key information of the second electronic device. The fifth electronic device may further store the public key information of the second electronic device based on an account of the second electronic device.

In S110, after obtaining the public key information of the second electronic device, the fifth electronic device encrypts the public key information of the fifth electronic device based on the shared key A, to obtain a public key exchange packet. The fifth electronic device sends the public key exchange packet to the hub device A; the hub device A forwards the public key exchange packet to the cloud device; and then the cloud device forwards the public key exchange packet to the second electronic device. After receiving the public key exchange packet, the second electronic device may obtain the public key information of the fifth electronic device, that is, a public key exchange process is completed. The second electronic device may further store the public key information of the fifth electronic device based on the identifier of the fifth electronic device.

In S111, the second electronic device and the fifth electronic device perform station to station (station to station. STS) negotiation based on the public key information and the private key information of the fifth electronic device, and the public key information and the private key information of the second electronic device, to generate, according to an encryption algorithm (for example, an elliptic curve algorithm), a shared key B, and further perform identity authentication based on exchanged public key information.

In S112, after identity authentication succeeds, the second electronic device sends, to the fifth electronic device by using the cloud device and the hub device A, a control command that is encrypted based on the shared key B. Specifically, the control command of the user for the fifth electronic device is encrypted on the second electronic device based on the shared key B. An encrypted control command is forwarded by the cloud device, and then is transmitted to the hub device A. Because the cloud cannot learn the key, the cloud cannot perceive specific content of the control command. Then, the hub device A forwards the encrypted control command to the fifth electronic device, and the fifth electronic device decrypts the control command based on the shared key B. In this way, the user controls the fifth electronic device at home by using the hub device A.

S111 may be understood as a process in which the second electronic device and the fifth electronic device perform station to station STS negotiation based on exchanged public key information, to generate, according to the encryption algorithm, the shared key B. For a specific procedure, refer to a specific procedure shown in FIG. 7 in the following figures. Details are not described herein again.

However, because memory of the first electronic device is small, a HiChain-related component cannot be integrated on the first electronic device, for example, an identity authentication component and a station to station encryption negotiation capability cannot be integrated on the first electronic device. Therefore, the first electronic device does not have a capability of performing station to station key negotiation with the second electronic device used by the user (for example, the mobile phone used by the user). A control command of the user for the first electronic device is sent to the hub device A by using the cloud, and the hub device A forwards the control command to the first electronic device.

Figure 3:
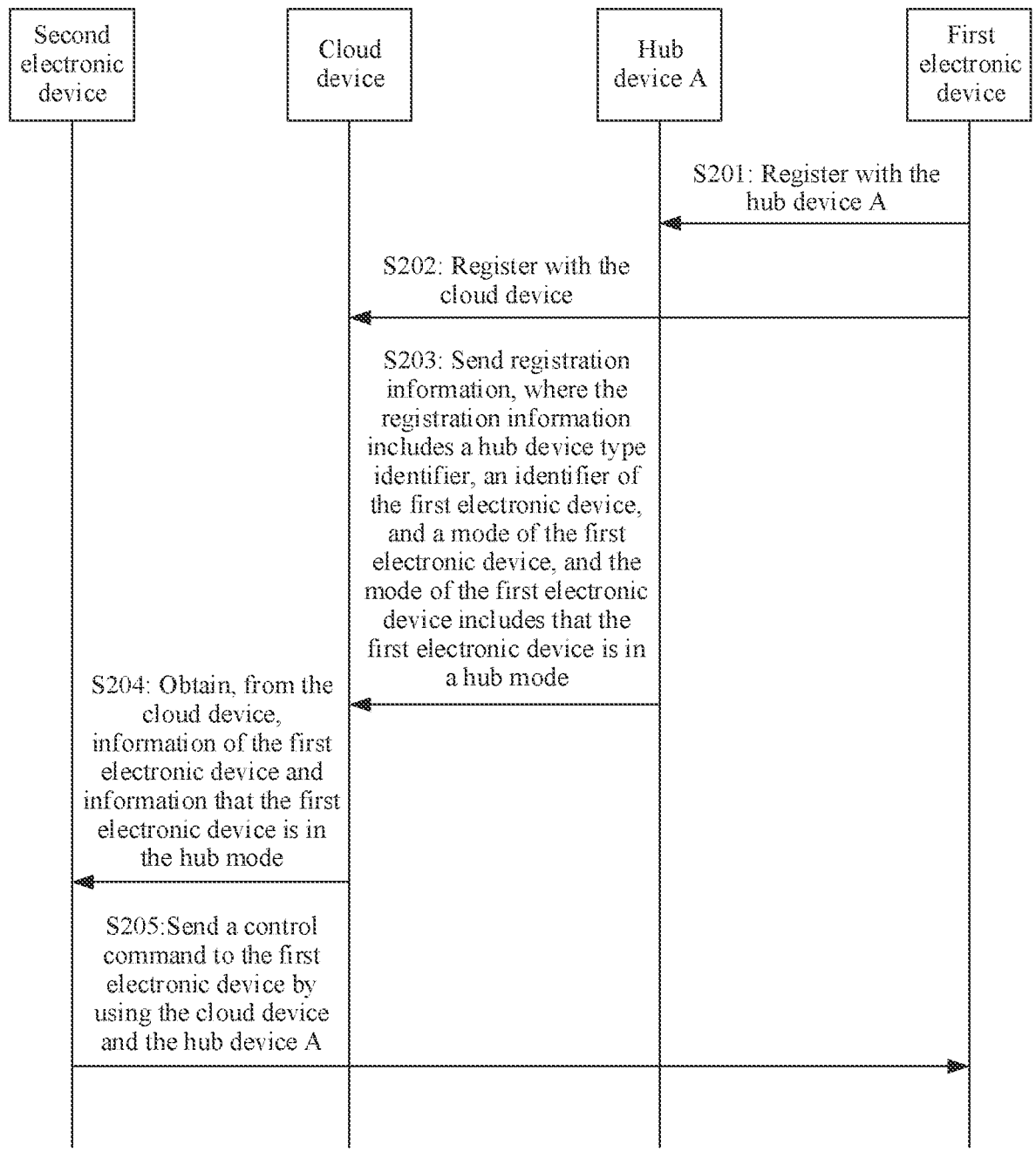
FIG. 3 is a schematic flowchart of a method in which a user controls a first electronic device by using a second electronic device in a conventional technology.

FIG. 3 is a schematic diagram of a method 200 in which the second electronic device controls the first electronic device in the scenario shown in FIG. 1. As shown in FIG. 3:

In S201, the first electronic device at user's home first accesses or registers with the hub device A. and establishes a communication connection to the hub device A. For example, a communication connection based on a communication protocol such as Wi-Fi or Bluetooth may be established between the first electronic device and the hub device A. In S101, the first electronic device may further report information such as an identifier and a device ID of the first electronic device to the hub device A.

S202: The first electronic device at user's home registers with or accesses a cloud device, for example, reports the information such as the identifier and the device ID of the first electronic device to the cloud device.

In S203, the hub device A sends registration information to the cloud device, and registers with the cloud device. The registration information includes a hub device type identifier, the identifier of the first electronic device, and a mode of the first electronic device. The mode of the first electronic device includes that the first electronic device is in a hub mode. In this embodiment of this application, the hub mode may be understood as that the first electronic device needs to communicate with a device (for example, the second electronic device) in an external network by using the hub device A. When the device in the external network needs to send information to the first electronic device, the device in the external network needs to first send the information to the hub device A, and then the hub device A forwards the information to the first electronic device. When the first electronic device needs to send information to the device in the external network, the first electronic device needs to first send the information to the hub device A, and then the hub device A forwards the information to the device in the external network.

S204: The second electronic device obtains, from the cloud device, information of the first electronic device and information that the first electronic device is in the hub mode. For example, the information of the non-sensitive device may include information such as the identifier and the device ID of the first electronic device.

In S205, the second electronic device sends a control command to the first electronic device by using the cloud device and the hub device A.

Specifically, for the control command of the user for the first electronic device, the second electronic device forwards the control command to the hub device A by using the cloud, and the hub device A forwards the control command to the first electronic device. In this way, the user controls the first electronic device at home by using the hub device A.

However, for the first electronic device, station to station encryption is not performed on the control command, the cloud can perceive a specific control command, and information (for example, the control command) leakage and spoofing cannot be avoided, and the cloud may learn the control command and may tamper with the control command. This reduces security and causes a risk of leaking user privacy. In addition, accuracy of controlling the first electronic device by the user cannot be ensured, and user experience is affected.

In view of this, this application provides a key negotiation method. In a process in which the first electronic device communicates with the second electronic device by using the hub device, the hub device replaces the first electronic device, to perform negotiation with the second electronic device, and replaces the first electronic device, to generate a shared key. Information sent by the second electronic device to the first electronic device may be encrypted on the second electronic device based on the shared key, and encrypted information is transmitted to the hub device by using the cloud. Because the cloud cannot learn the shared key, the cloud cannot learn specific content of the information, and cannot tamper with the information. In this way, security of information (for example, the control command) transmission between the second electronic device and the hub device is improved, accuracy of controlling the first electronic device by the user is ensured, and user experience is improved.

The key negotiation method provided in this application is described below with reference to specific examples.

Figure 4:
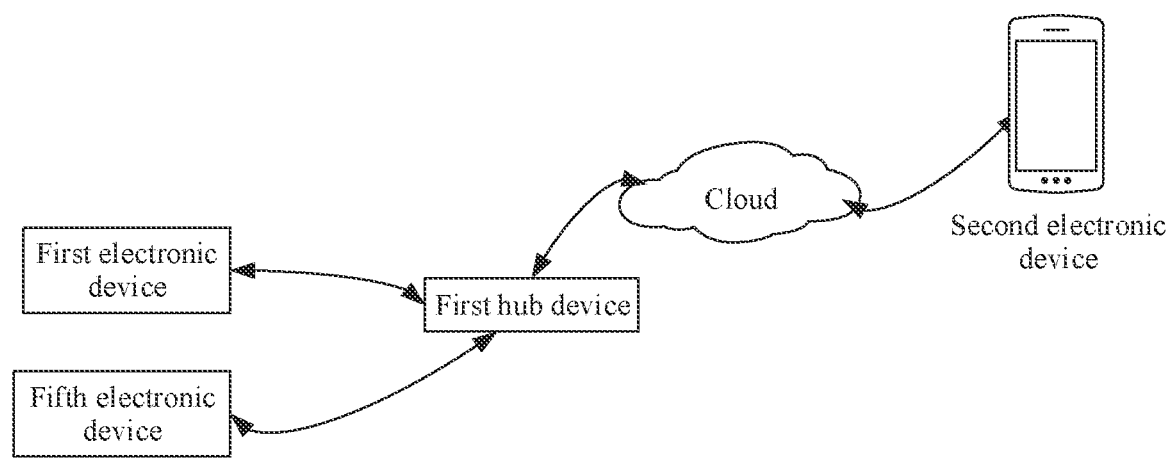
FIG. 4 is a schematic diagram of an example of a communication system applicable to an embodiment of this application according to this application.

FIG. 4 is a schematic diagram of an example of an architecture of a wireless communication system applicable to an embodiment of this application. As shown in FIG. 4, a hub device may manage a plurality of first electronic devices. FIG. 4 shows a scenario in which there is one first electronic device (a non-sensitive device) and one fifth electronic device (a sensitive device). A control command of a user for the first electronic device is transmitted to the hub device through a communication link between the hub device (for differentiation, referred to as a first hub device) and a second electronic device (for example, a smartphone) used by the user, and then is sent to the first electronic device by using the first hub device, so that the user controls the first electronic device. The communication link between the second electronic device and the first hub device may be a cloud transmission link established based on a cellular network protocol. A communication connection based on a communication protocol such as Wi-Fi or Bluetooth may be established between the fifth electronic device and the first hub device.

It should be understood that, in this embodiment of this application, a quantity of hub devices and a quantity of first electronic devices are not limited. For example, in the scenario shown in FIG. 4, there may be a plurality of hub devices and more first electronic devices. Further, in the scenario shown in FIG. 4, there may be a plurality of fifth electronic devices. This is not limited herein in this embodiment of this application.

It should be further understood that in this embodiment of this application, a HiChain-related component may be replaced with another component or referred to as another name, provided that the component can complete key generation, key negotiation, encryption/decryption processing, and the like. This is not limited in this embodiment of this application. The following performs description by using the HiChain-related component as an example.

Figure 5A:
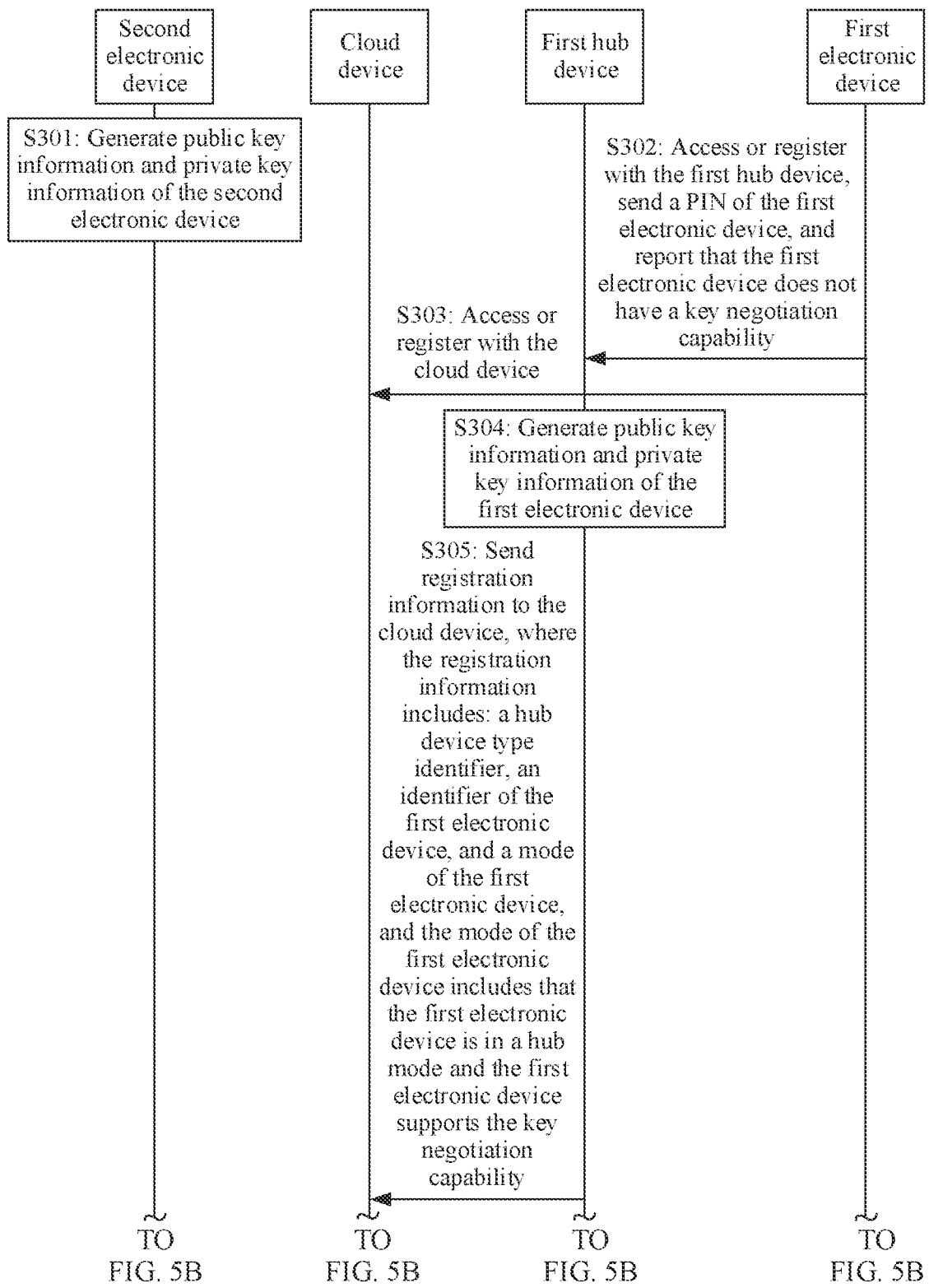
FIG. 5A to FIG. 5C are a schematic flowchart of an example of a key negotiation method according to an embodiment of this application.
Figure 5B:
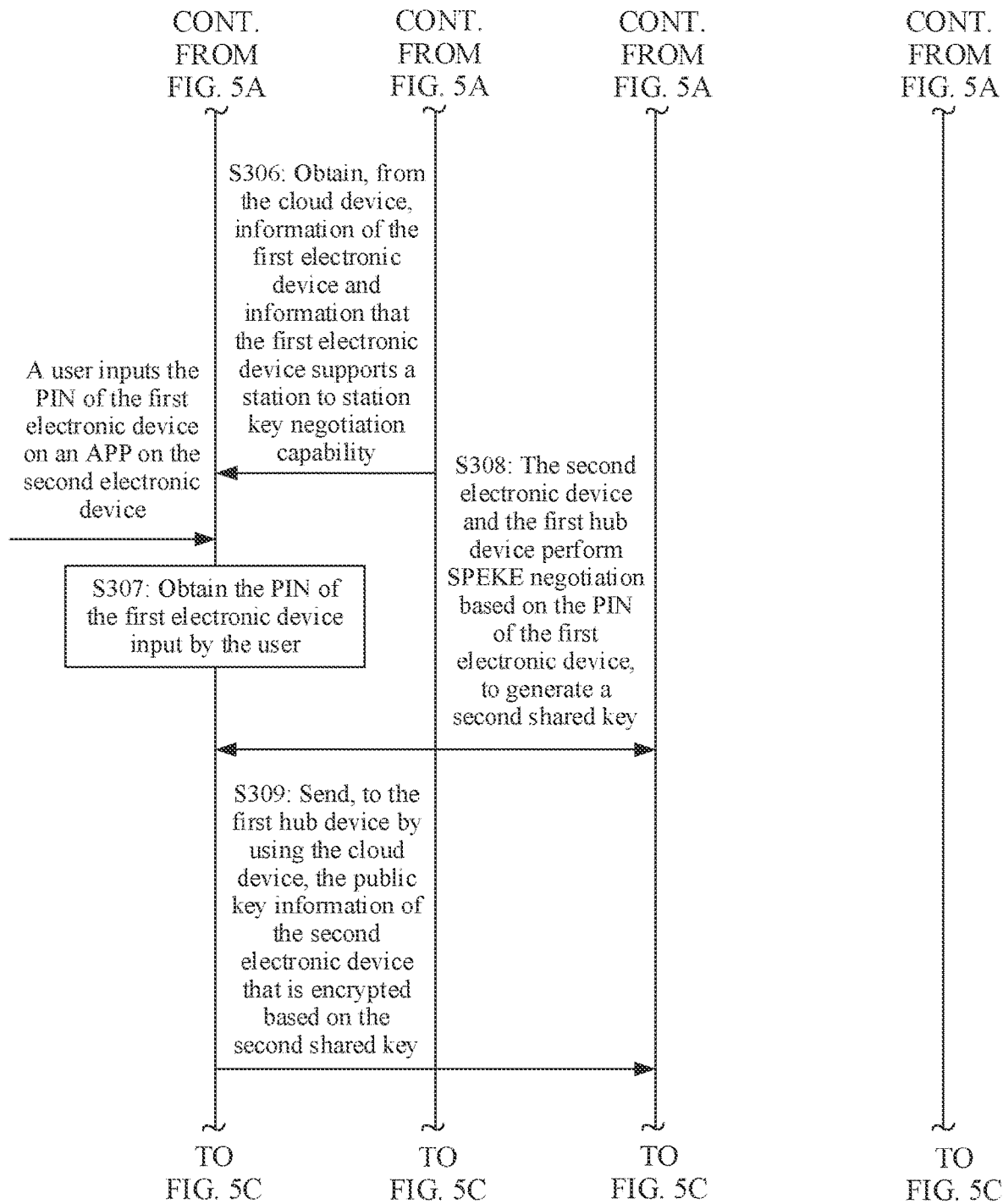
Figure 5C:
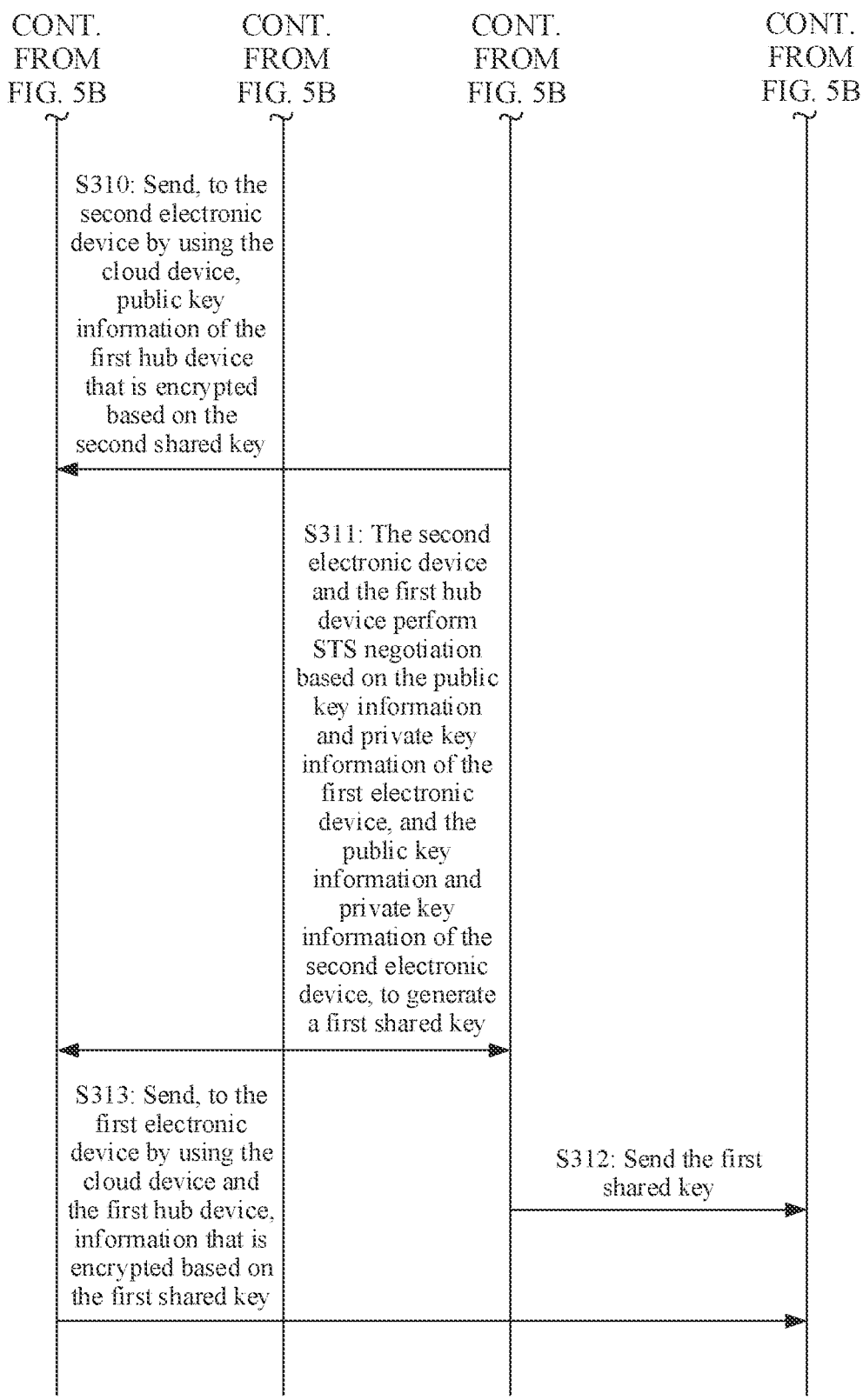

FIG. 5A to FIG. 5C are a schematic flowchart of a key negotiation method 300 provided in this application in the architecture shown in FIG. 4. As shown in FIG. 5A to FIG. 5C, the method 300 includes S301 to S312.

S301: The second electronic device (for example, an APP on a mobile phone) used by the user generates public key information (indicated by cpk1) and private key information (indicated by cpk2) of the second electronic device. The public key information and the private key information correspond to an account of the second electronic device.

S302: The first electronic device (for example, a first electronic device 1) accesses or registers with the first hub device. For example, in this embodiment of this application, the first electronic device may access the first hub device in an authcode manner. The authcode may be understood as a function for performing encryption and decryption by using an exclusive OR operation, and the authcode function is used to provide an encryption protection function for transmitted data. When the data arrives at a terminal, the authcode is used to decrypt encrypted data, to restore the data. In other words, information transmitted between the first electronic device and the first hub device may be encrypted by using the authcode function. A communication connection based on the communication protocol such as Wi-Fi or Bluetooth may be established between the first electronic device and the first hub device. In S202, the first electronic device may further send information such as a personal identification number (personal identification number, PIN) and a device ID of the first electronic device to the first hub device. In addition, in S302, the first electronic device may further report to the first hub device that the first electronic device does not have a key negotiation capability. In this embodiment of this application, that the first electronic device does not have the key negotiation capability means that the first electronic device cannot generate public key information and private key information of the first electronic device, and does not have a station to station key negotiation capability.

Optionally, in this embodiment of this application, a first identification code of the first electronic device includes the PIN of the first electronic device.

S303: The first electronic device accesses or registers with the cloud device, for example, reports information such as an identifier and a device attribute of the first electronic device to the cloud device, or registers information such as an identifier and a device attribute of the first electronic device with the cloud device.

In S304, after the first electronic device registers with the first hub device, because the first hub device has learned that the first electronic device does not have the key negotiation capability and does not have a capability of generating the public key information and the private key information, it may be determined that the first hub device needs to replace the first electronic device, to perform key negotiation. The public key information and the private key information of the first electronic device need to be used in a key negotiation process. Therefore, the first hub device may replace the first electronic device, to generate the public key information (indicated by csk1) and the private key information (indicated by csk2) of the first electronic device. Specifically, the first hub device may generate public key information and private key information, and then associate the public key information and the private key information with the device ID of the first electronic device. The public key information and the private key information that are associated with the device ID of the first electronic device are the public key information and the private key information of the first electronic device that are generated by the first hub device.

In S305, the first hub device sends registration information to the cloud device, and registers with the cloud device (in this embodiment of this application, the cloud device may also be referred to as a home cloud). The registration information includes a hub device type identifier, the identifier of the first electronic device, and a mode of the first electronic device. The mode of the first electronic device includes that the first electronic device is in a hub mode and that the first electronic device supports the key negotiation capability. The hub device type identifier indicates that the device is the hub device. In this embodiment of this application, the hub mode may be understood as that the first electronic device needs to communicate with a device (for example, the second electronic device) in an external network by using the first hub device. When the device in the external network needs to send information to the first electronic device, the device in the external network needs to first send the information to the first hub device, and then the first hub device forwards the information to the first electronic device. When the first electronic device needs to send information to the device in the external network, the first electronic device needs to first send the information to the first hub device, and then the first hub device forwards the information to the device in the external network. It should be understood that, in this embodiment of this application, the step S303 may be replaced with S305, that is, S303 is an optional step.

In S306, the second electronic device obtains, from the cloud device, information of the first electronic device and information that the first electronic device supports the station to station key negotiation capability. For example, the information of the first electronic device includes that the first electronic device is in the hub mode.

In S307, the second electronic device obtains the PIN of the first electronic device that is input by the user on an APP on the second electronic device.

In S308, the second electronic device and the first hub device perform SPEKE negotiation based on the PIN of the first electronic device, to generate a second shared key, and separately store the second shared key. For a process in which the second electronic device and the first hub device perform SPEKE negotiation based on the PIN of the first electronic device, to generate the second shared key, refer to a specific procedure shown in FIG. 6 in the following figures. Details are not described herein again.

In S309, the second electronic device sends, to the first hub device by using the cloud device, public key information of the second electronic device that is encrypted based on the second shared key. For example, after determining that the first electronic device is in the hub mode, the second electronic device performs an operation of adding the first electronic device to a device security protection list, and requests to perform public key exchange with the first electronic device. The second electronic device encrypts the public key information of the second electronic device based on the second shared key, to obtain a public key exchange packet, and the public key exchange packet carries the identifier of the first electronic device. The second electronic device first sends the public key exchange packet to the cloud device, and then the cloud device forwards the public key exchange packet to the first hub device. After receiving the public key exchange packet, the first hub device decrypts the public key exchange packet based on the second shared key. If it is determined that a device identifier carried in the packet is the identifier of the first electronic device, the first hub device replaces the first electronic device, to perform public key information exchange. In this way, the first hub device obtains the public key information of the second electronic device. The first electronic device may further store the public key information of the second electronic device based on the account of the second electronic device.

In S310, the first hub device sends, to the second electronic device by using the cloud device, public key information of the first electronic device that is encrypted based on the second shared key. For example, after obtaining the public key information of the second electronic device, the first hub device encrypts the public key information of the first electronic device based on the second shared key, to obtain a public key exchange packet. The first hub device sends the public key exchange packet to the cloud device, and then the cloud device forwards the public key exchange packet to the second electronic device. After receiving the public key exchange packet, the second electronic device may obtain the public key information of the first electronic device, that is, a public key exchange process is completed.

In S311, the second electronic device and the first hub device perform STS negotiation based on the public key information and the private key information of the first electronic device, and the public key information and the private key information of the second electronic device, to generate, according to an encryption algorithm (for example, an elliptic curve algorithm), a first shared key, and perform identity authentication based on exchanged public key information. Further, the second electronic device and the first hub device may separately store the first shared key.

In other words, a process of S311 is a process in which the second electronic device and the first hub device perform STS negotiation, to generate the first shared key according to the encryption algorithm. In other words, the second electronic device and the first hub device maintain the same first shared key. After S314, the second electronic device and the first hub device complete a station to station key negotiation process. For a specific procedure of the station to station key negotiation, refer to a specific procedure shown in FIG. 7 in the following figures. Details are not described herein again.

In S312, the first hub device may further encrypt the first shared key by using the authcode function, and send an encrypted first shared key to the first electronic device. It should be understood that S312 is an optional step.

In S313, the second electronic device sends, to the first electronic device by using the cloud device and the first hub device, information that is encrypted based on the first shared key. For example, the information may include a control command of the second electronic device for the first electronic device.

Specifically, in S313, when the user uses the second electronic device to send information to the first electronic device, the information is encrypted on the second electronic device based on the first shared key, encrypted information is transmitted to the cloud device, and the cloud device forwards the encrypted information to the first hub device. Because the cloud cannot learn the shared key, the cloud cannot learn specific content of the information, and cannot tamper with the information. In this way, security of the information is improved, accuracy of controlling the first electronic device by the user is ensured, and user experience is improved.

In this embodiment of this application, if the method 300 does not include S312, in S313, information that needs to be sent by the user is encrypted on the second electronic device based on the first shared key, and encrypted information is transmitted to the cloud device. After the cloud device forwards the encrypted information to the first hub device, the first hub device may decrypt the information based on the first shared key, encrypt decrypted information by using the authcode function, and send encrypted information to the first electronic device. After receiving the encrypted information, the first electronic device performs decryption by using the authcode function, to obtain specific content of the information, and perform a corresponding operation based on the specific content of the information.

In this embodiment of this application, if the method 300 includes S312, in S313, information that needs to be sent by the user is encrypted on the second electronic device based on the first shared key, and encrypted information is transmitted to the cloud device. After the cloud device forwards the encrypted information to the first hub device, the first hub device may decrypt the information based on the first shared key, encrypt decrypted information by using the authcode function, and send encrypted information to the first electronic device. Alternatively, the first hub device may not decrypt the information, but encrypt, by using the authcode function, the information that is encrypted based on the first shared key, and then send encrypted information to the first electronic device. After receiving the encrypted information, the first electronic device decrypts the information by using the authcode function based on the first shared key, to obtain specific content of the information, and perform a corresponding operation based on the specific content of the information.

Optionally, in this embodiment of this application, if the method 300 includes S312, in S313, because the first electronic device has obtained the first shared key, w % ben the first hub device is faulty and cannot be used, the first electronic device may directly communicate with the second electronic device based on the first shared key by using the cloud device. In other words, when the first hub device is faulty and cannot be used, information that needs to be sent by the user is encrypted on the second electronic device based on the first shared key, and encrypted information is transmitted to the cloud device. The cloud device forwards the encrypted information to the first electronic device. After receiving the encrypted information, the first electronic device decrypts the information based on the first shared key, to obtain specific content of the information, and performs a corresponding operation based on the specific content of the information. In this way, information transmission reliability is ensured, and information transmission efficiency is improved.

In the scenario shown in FIG. 4, for the fifth electronic device, for a processing procedure of a control command of the fifth electronic device, refer to the descriptions of the specific procedure of the method 100 shown in FIG. 2A to FIG. 2C. The first hub device shown in FIG. 2A to FIG. 2C may be replaced with the first hub device. For brevity, details are not described herein again.

Figure 6:
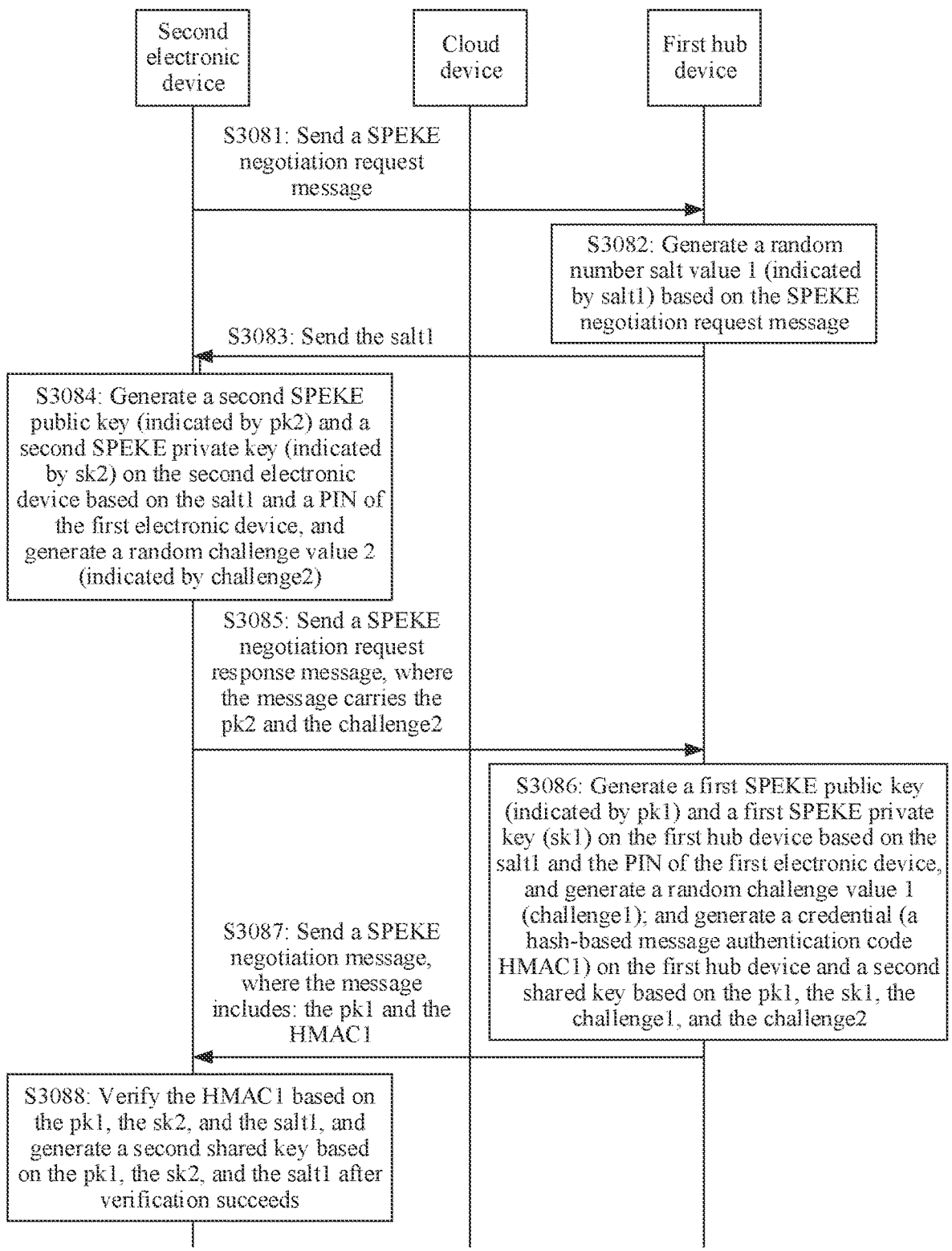
FIG. 6 is a schematic diagram of an example of a process in which a second electronic device and a first hub device perform SPEKE negotiation based on a PIN of a first electronic device, to generate a second shared key according to an embodiment of this application.

With reference to FIG. 6, the following describes a method in which the second electronic device and the first hub device perform SPEKE negotiation based on the PIN of the first electronic device, to generate the second shared key, that is, the specific procedure included in S308 in the method S300. As shown in FIG. 6, S308 specifically includes S3081 to S3088.

S3081: The second electronic device sends a SPEKE negotiation request message to the first hub device by using the cloud device.

S3082: The first hub device generates a random number salt value 1 (indicated by salt1) based on the SPEKE negotiation request message.

In S3083, the first hub device sends the salt1 to the second electronic device by using the cloud device.

In S3084, the second electronic device generates, based on the salt1 and the PIN of the first electronic device, a second public key (indicated by pk2) and a second private key (indicated by sk2) for the SPEKE on the second electronic device, and generates a random challenge value 2 (indicated by challenge2).

S3085: The second electronic device sends a SPEKE negotiation request response message to the first hub device by using the cloud device, where the SPEKE negotiation request response message carries the pk2 and the challenge2.

In S3086, the first hub device generates a first SPEKE public key (indicated by pk1) and a first SPEKE private key (sk1) of the first hub device based on the salt1 and the PIN of the first electronic device, generates a shared key 1 (SharedSecret1) based on the pk2 and the sk1, and derives a session key 1 (SessionKey1) and a session key 2 (SessionKey2) based on the shared key 1 (SharedSecret1) and the salt1. The first hub device generates a random challenge value 1 (indicated by challenge1). Then, based on the SessionKey2 and two challenge values (challenge1 and challenge2), a credential on the first hub device is generated: a hash-based message authentication code (hash-based message authentication code, HMAC1). Finally, the second shared key is generated based on the SessionKey1, the SessionKey2, and the salt1. For example, the second shared key may be a data encryption key (DataEncKey).

S3087: The first hub device sends a SPEKE negotiation message to the second electronic device by using the cloud device. The message includes: the pk1 and the HMAC1.

S3088: The second electronic device generates a shared key 2 (SharedSecret2) based on the pk1 and the sk2, derives a session key 3 (SessionKey3) and a session key 4 (SessionKey4) based on the shared key 2 and the salt1, verifies the HMAC1 based on the SessionKey3 and the SessionKey4, and generates the second shared key based on the session key 3 (SessionKey3), the session key 4 (SessionKey4), and the salt1 after the verification succeeds.

It should be understood that, in S108 in the method 100, a process in which the second electronic device and the fifth electronic device perform SPEKE negotiation based on the PIN of the fifth electronic device, to generate the first shared key is similar to the procedure shown in FIG. 6. A difference lies in that in S108, SPEKE negotiation is performed between the second electronic device and the fifth electronic device and is performed based on the PIN of the fifth electronic device. However, in the procedure shown in FIG. 6, SPEKE negotiation is performed between the second electronic device and the first hub device and is performed based on the PIN of the first electronic device. For a process in which the second electronic device and the fifth electronic device perform SPEKE negotiation based on the PIN of the fifth electronic device, to generate the first shared key, refer to the specific descriptions of the procedure shown in FIG. 6. Details are not described herein again.

Figure 7:
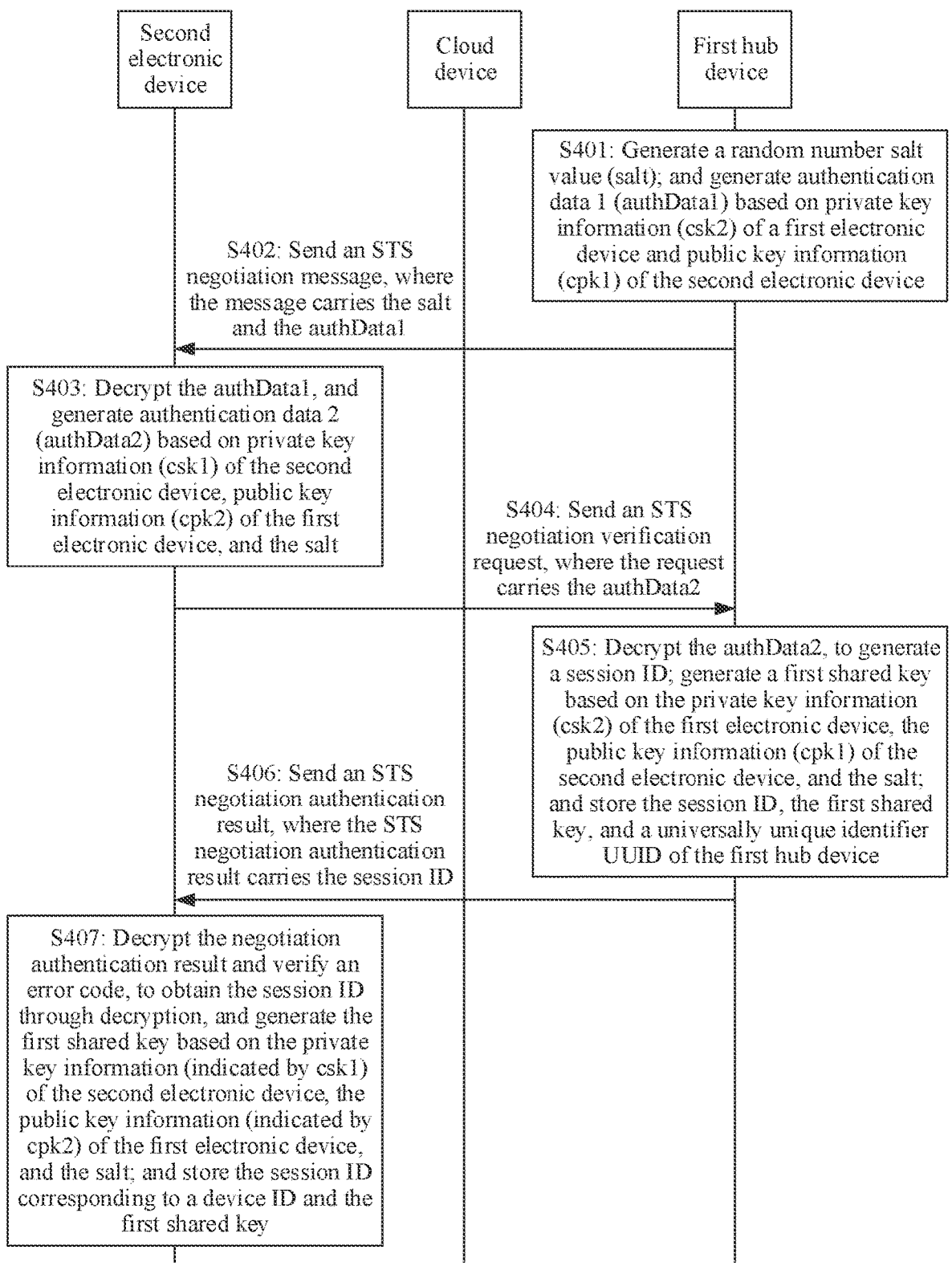
FIG. 7 is a schematic diagram of an example of a process in which a second electronic device and a first hub device perform station to station negotiation, to generate a first shared key according to an embodiment of this application.

With reference to FIG. 7, the following describes a specific procedure 400 in which the second electronic device and the first hub device perform STS negotiation, to generate the first shared key according to the encryption algorithm, that is, the specific procedure included in S311 in the method 300. As shown in FIG. 7, the specific procedure 400 included in S311 includes S401 to S407.

S401: The first hub device generates a random number salt value (indicated by salt); generates a shared key 3 (indicated by SharedKey3) based on the private key information (csk2) of the first electronic device and the public key information (cpk1) of the second electronic device; generates a session key 3 (indicated by SessionKey3) based on the salt and the SharedKey3; and signs device identity and session information based on a long-valid access key (indicated by lsk1) of the first hub device, to obtain a sign 1 (indicated by sign1), and encrypts the sign1 based on the SessionKey 3, to obtain authentication data 1 (indicated by authData1).

In S402, the first hub device sends an STS negotiation message to the second electronic device by using the cloud device, where the message carries the salt and the authData1.

In S403, the second electronic device generates a shared key 4 (indicated by SharedKey4) based on the private key information (indicated by csk1) of the second electronic device and the public key information (indicated by cpk2) of the first electronic device, derives a session key 4 (indicated by SessionKey4) based on the SharedKey4 and the salt, decrypts the authData1, verifies the sign1, signs identity and session information based on a long-valid access key (indicated by lsk2) of the second electronic device, to obtain a sign 2 (indicated by sign2), and encrypts the sign2 based on the session key 4, where challenge3 serves as information during encryption, to obtain authentication data 2 (indicated by authData2).

In S404, the second electronic device sends an STS negotiation verification request to the first hub device by using the cloud device, where the request carries the authData2.

In S405, the first hub device decrypts the authData2 and verifies the sign2, generates a session ID, to generate the first shared key (DataEncKey) based on the session key 3 and the salt. The first hub device stores the session ID, the first shared key, and a universally unique identifier (universally unique identifier, UUID) of the first hub device.

In S406, the first hub device returns an STS negotiation authentication result (authRet) to the second electronic device by using the cloud device, and the result carries the session ID and the session key 3.

In S407, the second electronic device decrypts the negotiation authentication result and verifies an error code, to obtain the session ID through decryption, and generates the first shared key (DataEncKey) based on the session key 3 and the salt; and the second electronic device stores the session ID corresponding to the device ID and the first shared key.

In other words, a process of S401 to S407 is a process in which the second electronic device and the first hub device perform STS negotiation, to generate the first shared key according to the encryption algorithm. In other words, the second electronic device and the first hub device maintain the same first shared key.

It should be understood that, in S111 in the method 100, a process in which the second electronic device and the fifth electronic device perform STS negotiation to generate the second shared key through negotiation is similar to the procedure shown in FIG. 7. A difference lies in that in Sill, STS negotiation is performed between the second electronic device and the fifth electronic device and is performed based on the public key information of the fifth electronic device. However, in the procedure shown in FIG. 7, STS negotiation is performed between the second electronic device and the first hub device and is performed based on the public key information of the first electronic device, that is, the first hub device replaces the first electronic device, to perform STS negotiation with the second electronic device. For a process in which the second electronic device and the fifth electronic device perform STS negotiation, to generate the second shared key, refer to the specific descriptions of the procedure shown in FIG. 7. Details are not described herein again.

Figure 8:
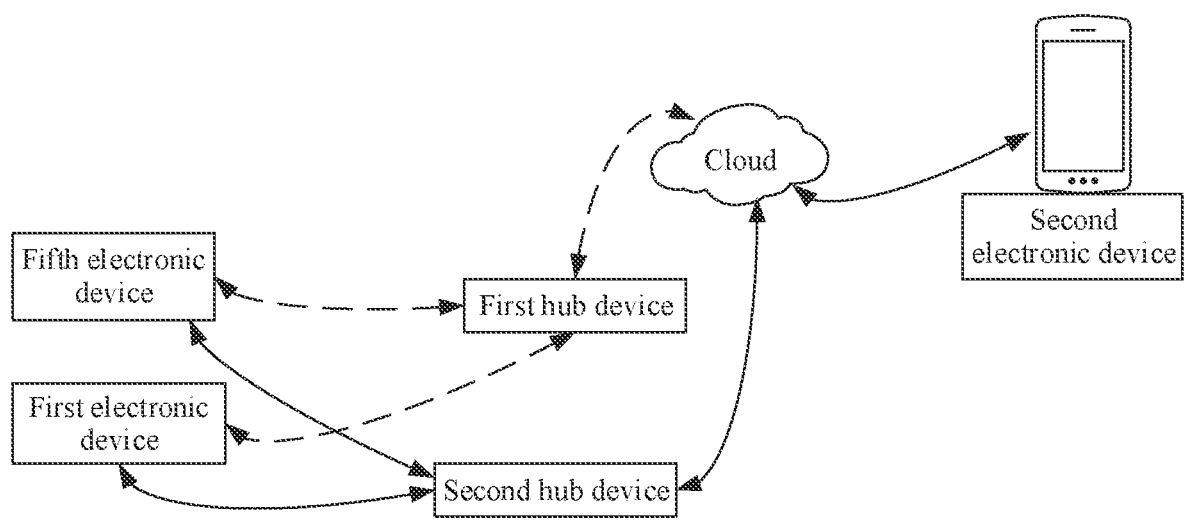
FIG. 8 is a schematic diagram of another example of a communication system applicable to an embodiment of this application according to this application.

Optionally, in this embodiment of this application, it is assumed that in the scenario shown in FIG. 4, in addition to the first hub device (namely, an active hub device) shown in FIG. 4, there are one or more second hub devices (namely, standby hub devices). For example, FIG. 8 is a schematic diagram of another example of an architecture of a wireless communication system applicable to an embodiment of this application. In a scenario shown in FIG. 8, an active hub device (a first hub device) and a standby hub device (a second hub device) are included.

It should be understood that, in this embodiment of this application, a quantity of standby hub devices and a quantity of first electronic devices are not limited. For example, in the scenario shown in FIG. 8, there may be a plurality of standby hub devices and more first electronic devices. This is not limited in this embodiment of this application.

Figure 9:
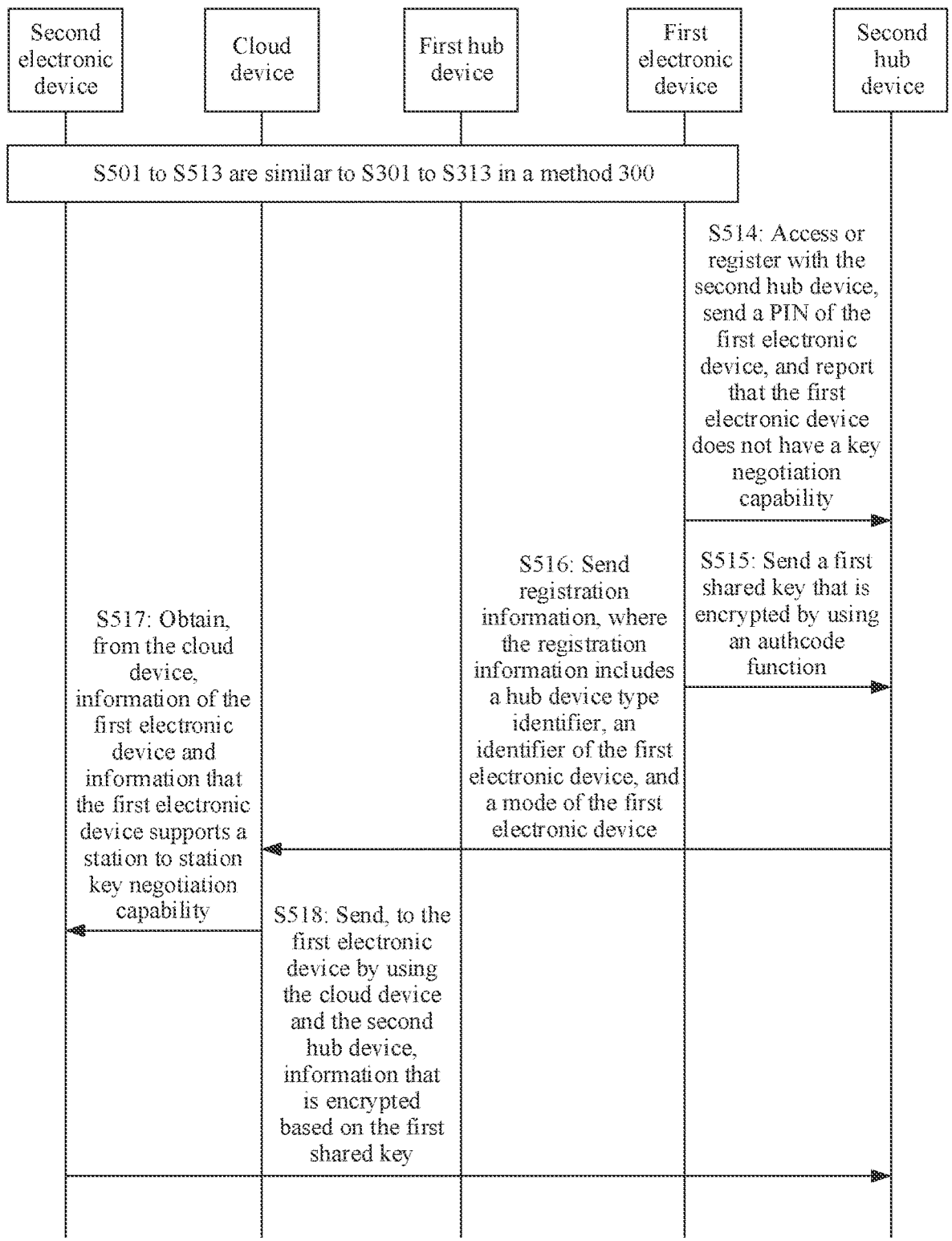
FIG. 9 is a schematic flowchart of another example of a key negotiation method according to an embodiment of this application.

FIG. 9 is a schematic flowchart of a key negotiation method 500 provided in this application in the architecture shown in FIG. 8. As shown in FIG. 9, the method 500 includes S501 to S518.

For descriptions of corresponding specific steps in S501 to S513, refer to the descriptions of corresponding steps in S301 to S313 in the foregoing method 300. For brevity, details are not described herein again.

S514: When the first hub device is in an unavailable state (for example, the first hub device is powered off, is moved out, or is faulty, a link between the first hub device and a cloud is broken, or a link between the first hub device and the first electronic device is broken), the first electronic device accesses or registers with the second hub device. For example, in this embodiment of this application, the first electronic device may access the second hub device in an authcode manner. In S514, the first electronic device may further send a PIN of the first electronic device to the second hub device. In addition, in S514, the first electronic device may further report to the second hub device that the first electronic device does not have a key negotiation capability.

In S515, the first electronic device may encrypt a first shared key by using an authcode function, and send an encrypted first shared key to the second hub device.

In S516, the second hub device sends registration information to the cloud device, and registers with the cloud device. The registration information includes a hub device type identifier, an identifier of the first electronic device, and a mode of the first electronic device. The mode of the first electronic device is a hub mode. Optionally, in S516, the mode of the first electronic device may further include that the first electronic device supports a station to station key negotiation capability.

In S517, after the second electronic device obtains information of the first electronic device from the cloud device, because the first hub device has reported to the cloud device that the first electronic device supports the station to station key negotiation capability before, after the second electronic device determines the information of the first electronic device, the second electronic device may determine that the first electronic device supports the station to station key negotiation capability. The first shared key has been generated between the second electronic device and the first electronic device. Therefore, after obtaining the identifier of the first electronic device, the second electronic device may determine that a control command sent to the first electronic device needs to be encrypted based on the first shared key.

In S518, the second electronic device sends, to the first electronic device by using the cloud device and the second hub device, information that is encrypted based on the first shared key.

Specifically, in S518, when the user needs to send information to the first electronic device by using the second electronic device, the second electronic device encrypts the information based on the first shared key, and transmits encrypted information to the cloud device, and the cloud device forwards the encrypted information to the second hub device. The second hub device may decrypt the information based on the first shared key, encrypt decrypted information by using the authcode function, and send encrypted information to the first electronic device. After receiving the encrypted information, the first electronic device performs decryption by using the authcode function, to obtain specific content of the information, and perform a corresponding operation based on the information. Alternatively, the second hub device may not decrypt the information, but encrypt, by using the authcode function, the information that is encrypted based on the first shared key, and then send encrypted information to the first electronic device. After receiving the encrypted information, the first electronic device decrypts the information by using the authcode function based on the first shared key, to obtain specific content of the information, and perform a corresponding operation based on the information.

Figure 10A:
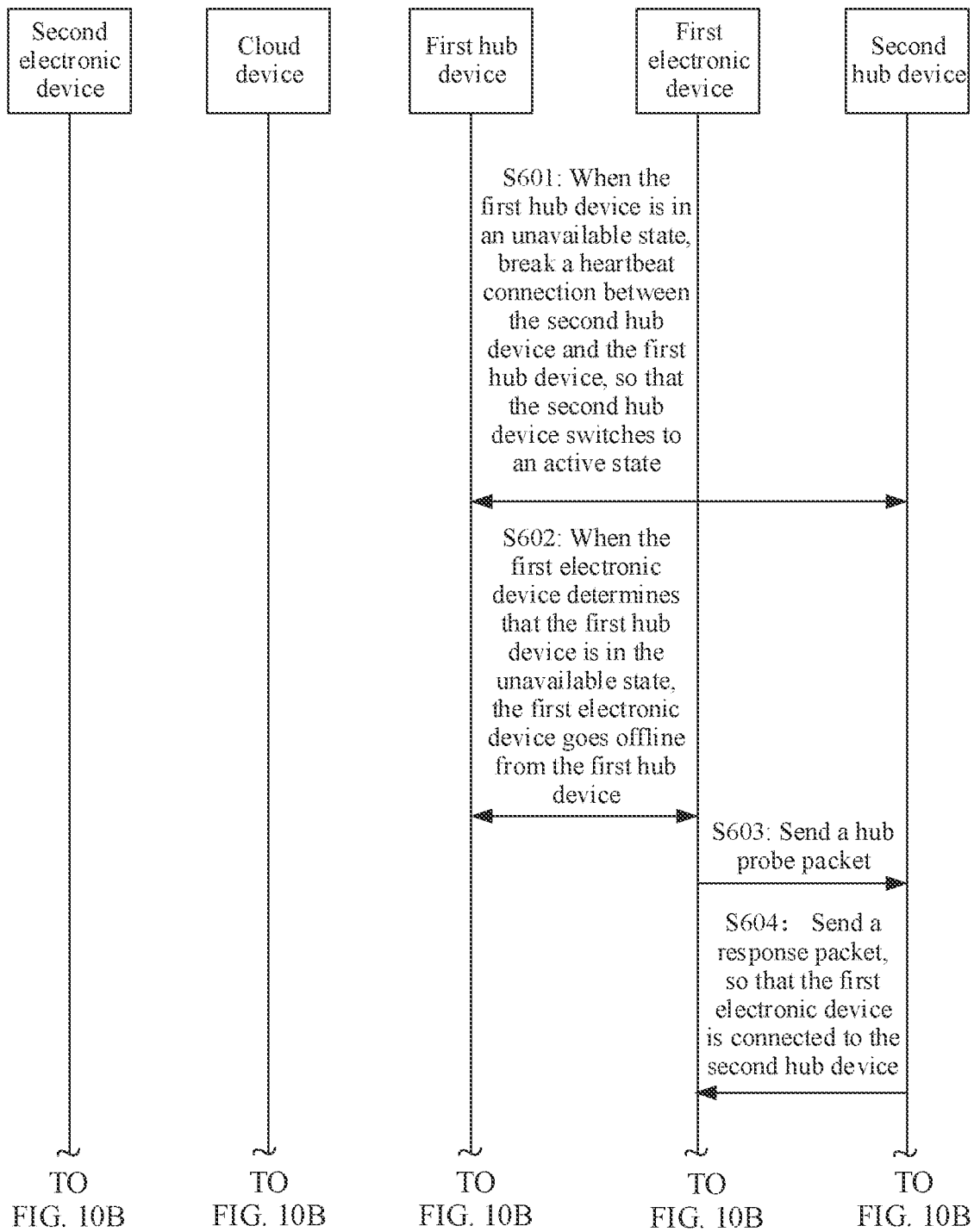
FIG. 10A and FIG. 10B are a schematic flowchart of still another example of a key negotiation method according to an embodiment of this application.
Figure 10B:
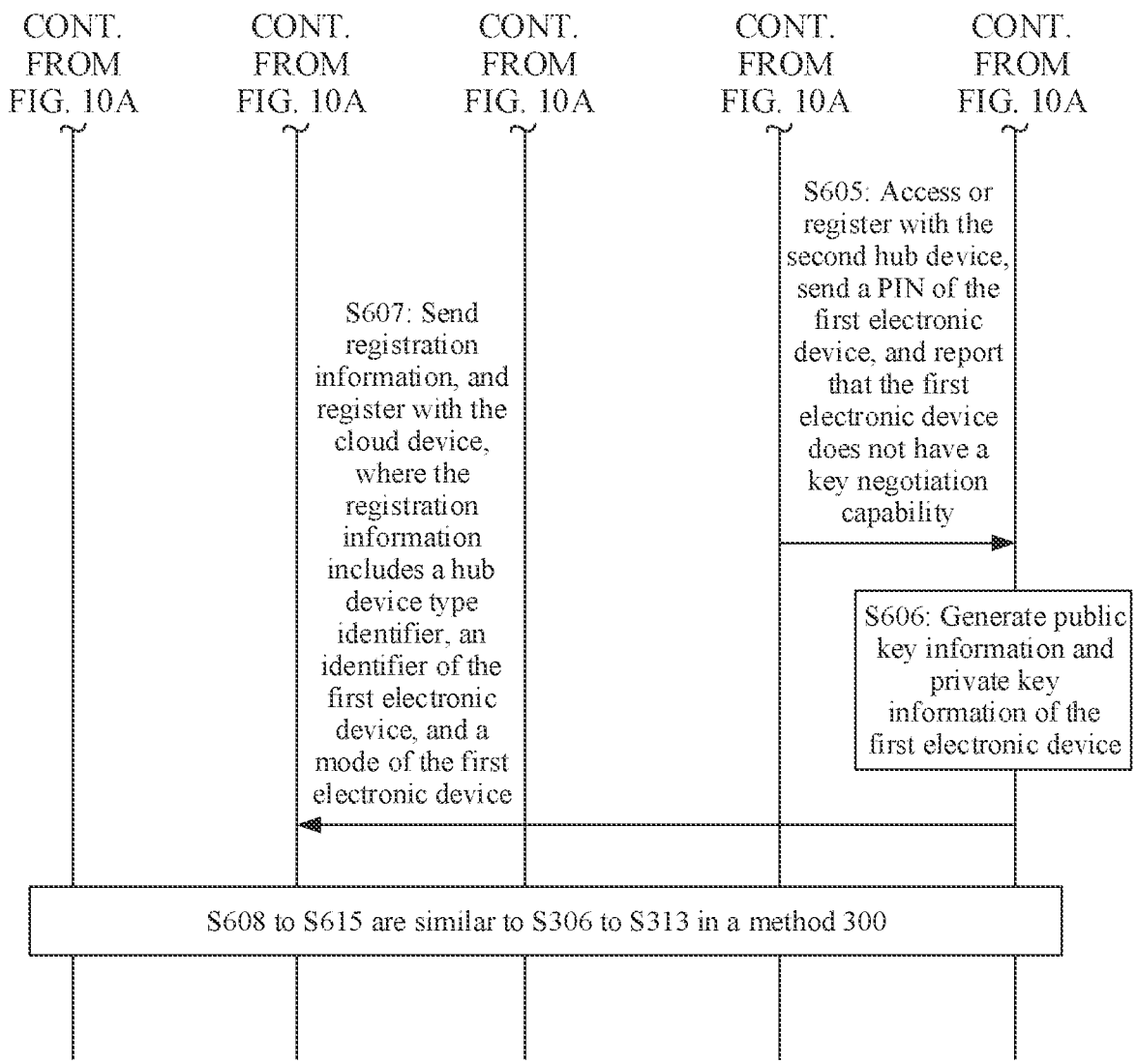

In the architecture shown in FIG. 8, optionally, in another possible implementation, FIG. 10A and FIG. 10B are a schematic flowchart of a key negotiation method 600 provided in this application in the architecture shown in FIG. 8. As shown in FIG. 10A and FIG. 10B, the method 600 includes S601 to S615. It should be understood that a procedure shown in FIG. 10A and FIG. 10B may be performed after the procedure shown in FIG. 5A to FIG. 5C.

S601: When the first hub device is in an unavailable state (for example, the first hub device is powered off, is moved out, or is faulty, a link between the first hub device and a cloud is broken, or a link between the first hub device and the first electronic device is broken), a heartbeat connection between the second hub device and the first hub device is broken, and the second hub device switches to an active state. In this embodiment of this application, the first hub device periodically sends a heartbeat packet to the second hub device. After receiving the heartbeat packet, the second hub device periodically sends a heartbeat response packet to the first hub device. After receiving the heartbeat response packet, the first hub device may determine that the second hub device is in an available state. If the first hub device does not receive the heartbeat response packet within a period of time, the first hub device may determine that the second hub device is in an unavailable state. If the second hub device does not receive the heartbeat packet within a period of time, the second hub device may determine that the first hub device is in an unavailable state. In this embodiment of this application, that the heartbeat connection between the second hub device and the first hub device is broken may be understood as that the first hub device determines whether the second hub device is in the available state by determining whether the heartbeat response packet sent by the second hub device is received; and the second hub device determines whether the first hub device is in the available state by determining whether the heartbeat packet sent by the first hub device is received.

In this embodiment of this application, periodically sending and receiving of a heartbeat packet and periodically sending and receiving of a heartbeat response packet between the first hub device and the first electronic device also exist. Specifically, the first hub device periodically sends a heartbeat packet to the first electronic device. After receiving the heartbeat packet, the first electronic device periodically sends a heartbeat response packet to the first hub device. After receiving the heartbeat response packet, the first hub device may determine that the first electronic device is in an available state. If the first electronic device does not receive, within a period of time, the heartbeat packet sent by the first hub device, the first electronic device may determine that the first hub device is in an unavailable state. If the first hub device does not receive, within a period of time, the heartbeat response packet sent by the first electronic device, the first hub device may determine that the first electronic device is in an unavailable state.

S602: When the first electronic device determines that the active hub device is in the unavailable state, the first electronic device goes offline from the first hub device.

S603: The first electronic device sends a hub probe packet to the second hub device. For example, the hub probe packet may be sent in a broadcast or multicast manner.

S604: After receiving the hub probe packet, the second hub device sends a response packet to the first electronic device, so that the first electronic device is connected to the second hub device.

S605: After receiving the response packet, the first electronic device accesses or registers with the second hub device, and sends a PIN of the first electronic device to the second hub device. In addition, in S605, the first electronic device may further report to the second hub device that the first electronic device does not have a key negotiation capability.

S606: After the first electronic device registers with the second hub device, because the second hub device has learned that the first electronic device does not have the key negotiation capability and does not have a capability of generating public key information and private key information, it may be determined that the second hub device needs to replace the first electronic device, to perform key negotiation. The public key information and the private key information of the first electronic device need to be used in a key negotiation process. Therefore, the second hub device may replace the first electronic device, to generate the public key information and the private key information of the first electronic device.

In S607, the second hub device sends registration information to the cloud device, and registers with the cloud device. The registration information includes a hub device type identifier, an identifier of the first electronic device, and a mode of the first electronic device. The mode of the first electronic device includes that the first electronic device is in a hub mode and that the first electronic device supports a station to station key negotiation capability.

After S607, for descriptions of corresponding specific steps in S608 to S615, refer to the descriptions of corresponding steps in S306 to S313 in the foregoing method 300. For brevity, details are not described herein again.

Optionally, in the method 600, in another possible implementation, after S605, S606 to S615 may not be performed, and are replaced with the steps S515 to S518 in the method 500. In other words, after S605, if the first hub device and the second electronic device have generated the first shared key through STS negotiation, the first electronic device may encrypt the generated first shared key by using the authcode function and send an encrypted first shared key to the second hub device, and the second hub device does not need to perform STS negotiation with the second electronic device again, to generate a new shared key. In this way, procedure complexity can be reduced, and signaling overheads can be reduced.

In the scenario shown in FIG. 8, for the fifth electronic device, when the first hub device is in the unavailable state, the fifth electronic device accesses or registers with the second hub device. For a processing procedure of a control command of the fifth electronic device, refer to the descriptions of the specific procedure of the method 100 shown in FIG. 2A to FIG. 2C. The hub device A shown in FIG. 2A to FIG. 2C is the second hub device. For brevity, details are not described herein again.

According to the key negotiation method provided in this application, in the scenario in which there is the first hub device and the second hub device, when the link between the first hub device and the first electronic device is broken, the first electronic device re-accesses or re-registers with the second hub device, and the control command that is transmitted between the second hub device and the second electronic device by using the cloud and that is for the first electronic device is encrypted based on the shared key. The shared key is generated through negotiation performed by the first hub device instead of the first electronic device. Alternatively, the shared key is generated through negotiation performed between the second hub device and the second electronic device. Because the cloud cannot learn the shared key, the cloud cannot learn the control command, and cannot tamper with the control command. In this way, security of control command transmission is improved. In addition, control command transmission reliability is ensured, and control command transmission efficiency is improved.

Figure 11:
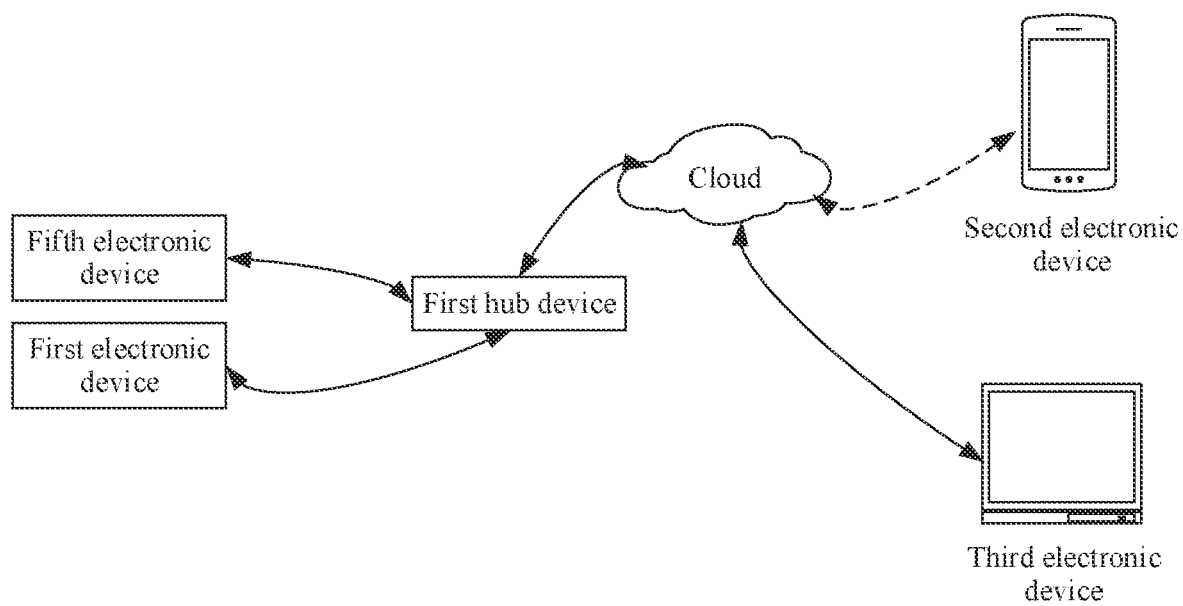
FIG. 11 is a schematic diagram of still another example of a communication system applicable to an embodiment of this application according to an embodiment of this application.

FIG. 11 is a schematic diagram of still another example of an architecture of a wireless communication system applicable to an embodiment of this application. As shown in FIG. 11, the hub device may manage a plurality of first electronic devices and fifth electronic devices. FIG. 11 shows a scenario in which there is one first electronic device and one fifth electronic device. In the example shown in FIG. 11, the control station device includes a primary control station device (a second electronic device) and a plurality of secondary control station devices (third electronic devices). FIG. 11 shows a scenario in which there is one secondary control station device. In an example shown in FIG. 11, the primary control station device and the secondary control station device respectively correspond to different accounts. Therefore, the secondary control station device and the primary control station device respectively correspond to different public key information, and respectively correspond to different private key information. For example, the primary control station device may be a smartphone used by a user, and the secondary control device may be a PAD used by the user. The communication link between the first hub device and each of the primary control station device and the secondary control station device may be cloud transmission link established based on a cellular network protocol. A communication connection based on the communication protocol such as Wi-Fi or Bluetooth may be established between the first electronic device and the first hub device.

It should be understood that, in this embodiment of this application, a quantity of third electronic devices is not limited. For example, in the scenario shown in FIG. 11, there may be a plurality of third electronic devices. This is not limited in this embodiment of this application.

Figure 12A:
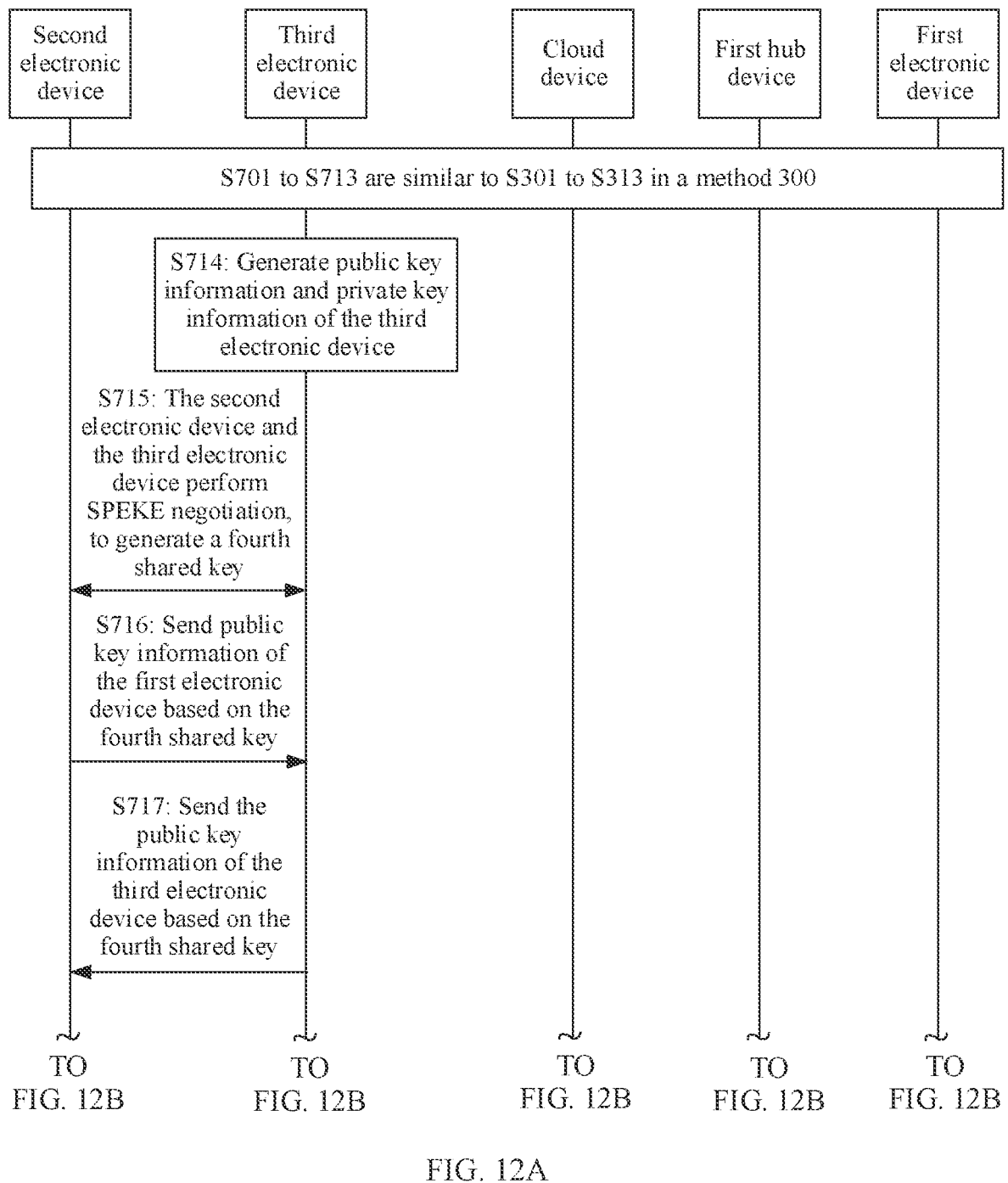
FIG. 12A to FIG. 12C are a schematic flowchart of yet another example of a key negotiation method according to an embodiment of this application.
Figure 12B:
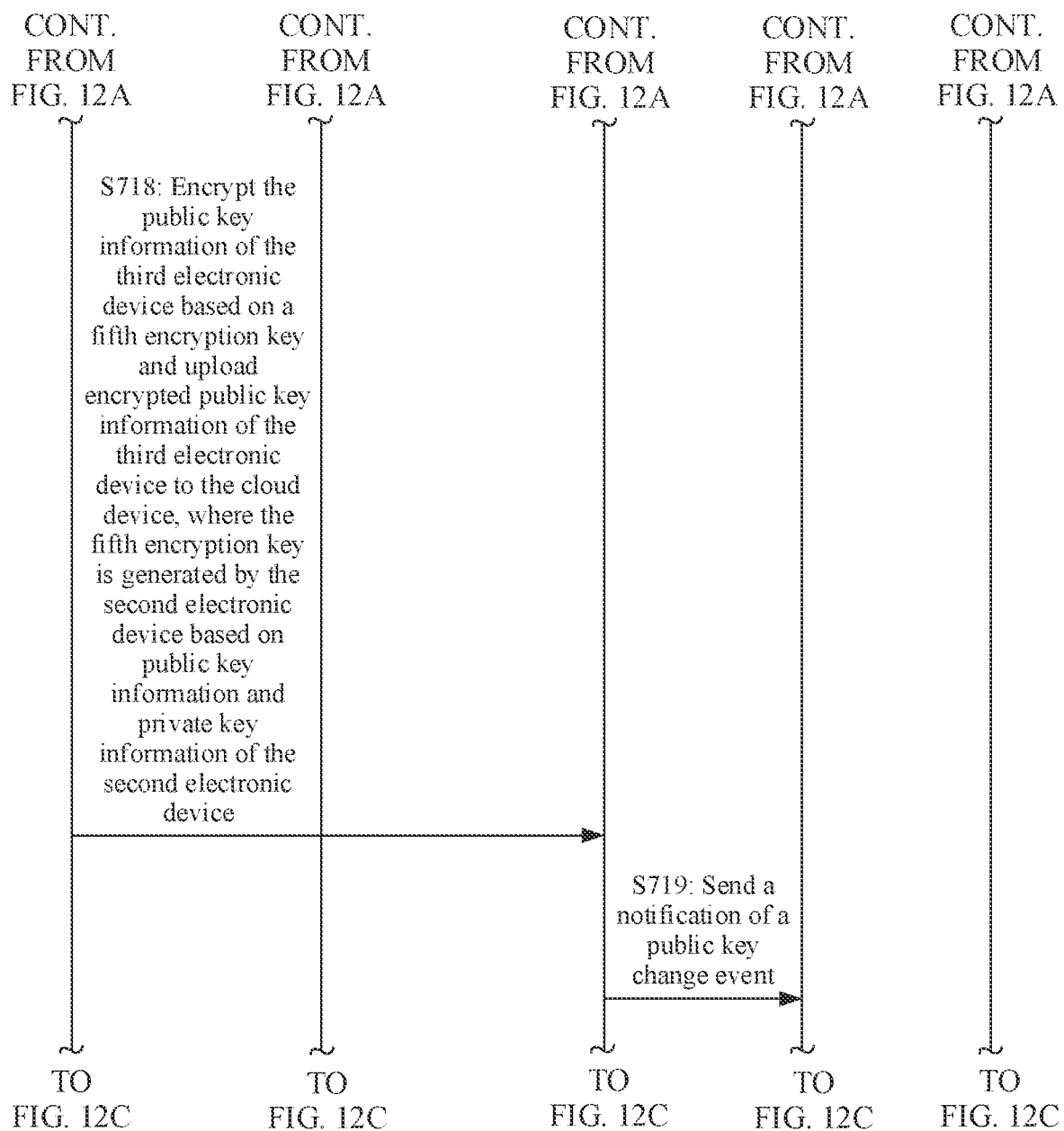
Figure 12C:
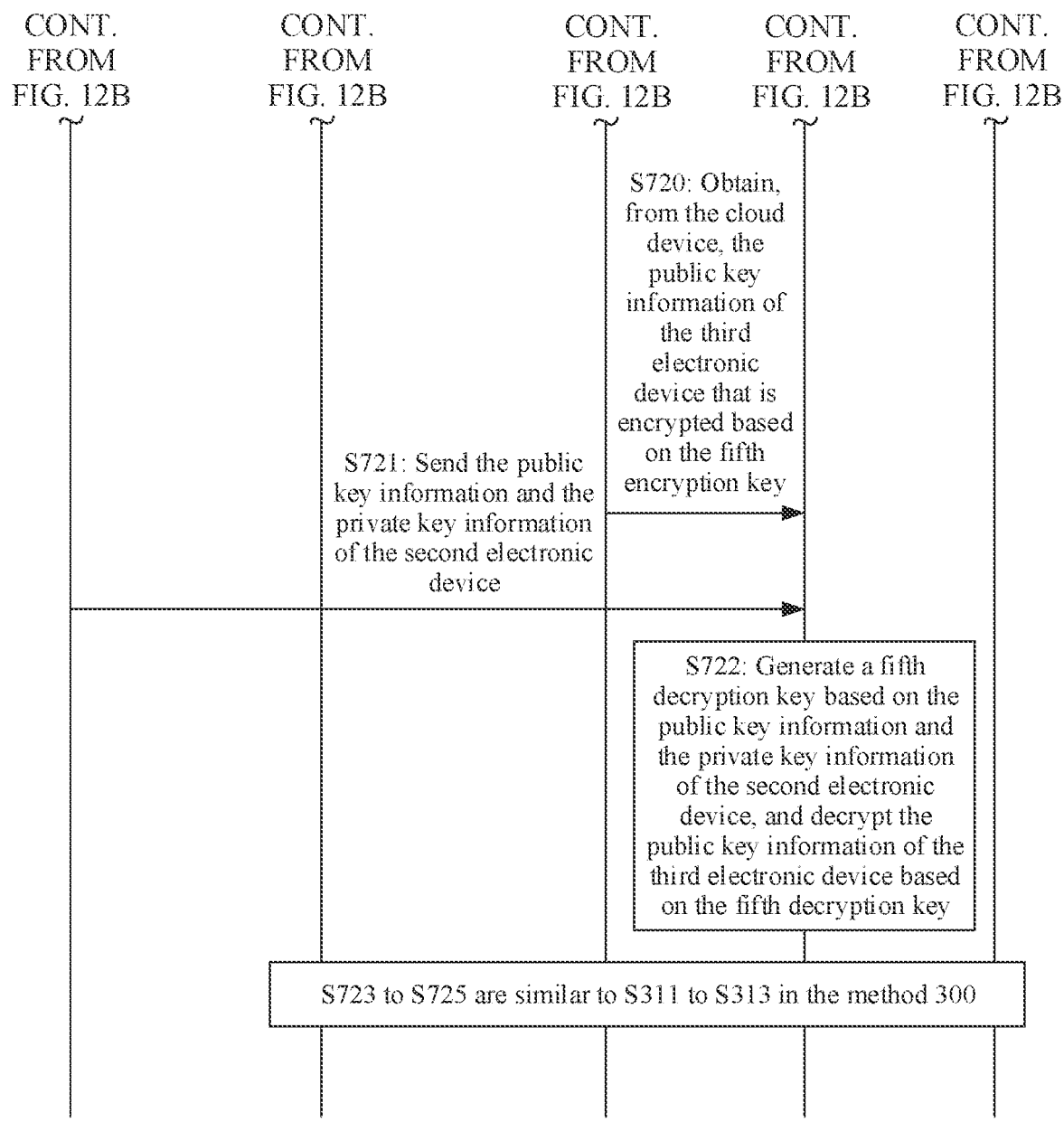

In a possible implementation, FIG. 12A to FIG. 12C are a schematic flowchart of a key negotiation method 700 provided in this application in the architecture shown in FIG. 11. FIG. 12A to FIG. 12C show a case in which the second electronic device (a primary control station device) and the third electronic device (a secondary control station device) respectively correspond to different accounts. As shown in FIG. 12A to FIG. 12C, the method 700 includes S701 to S725.

For descriptions of corresponding specific steps in S701 to S713, refer to the descriptions of corresponding steps in S301 to S313 in the foregoing method 300. For brevity, details are not described herein again.

S714: The third electronic device generates public key information and private key information of the third electronic device. The public key information and the private key information correspond to an account of the third electronic device.

In S715, when the third electronic device controls the first electronic device (for example, when the second electronic device shares the first electronic device managed by the hub with the third electronic device for control), the third electronic device and the second electronic device perform SPEKE negotiation, to generate a fourth shared key. For a specific process of S715, refer to the descriptions of S308 in the method 300. For brevity, details are not described herein again.

In S716, the second electronic device encrypts public key information of the first electronic device based on the fourth shared key generated through SPEKE negotiation in S715, and sends encrypted public key information of the first electronic device to the third electronic device. Further, the third electronic device may store the public key information of the first electronic device.

In S717, the third electronic device encrypts the public key information of the third electronic device based on the fourth shared key generated through SPEKE negotiation in S715, and sends encrypted public key information of the third electronic device to the second electronic device. Further, the second electronic device may store the public key information of the third electronic device.

In S718, the second electronic device encrypts the public key information of the third electronic device based on a fifth encryption key and uploads encrypted public key information to a cloud device. The fifth encryption key is generated by the second electronic device based on public key information and private key information of the second electronic device.

In S719, public key information previously stored in the cloud device is the public key information of the second electronic device. After the second electronic device uploads the public key information of the third electronic device to the cloud device, the public key information stored in the cloud device changes. Therefore, the cloud device sends a notification of a public key change event to the hub device, to notify the hub device that the public key information stored in the cloud device changes.

In S720, after receiving the notification of the public key change event, the first hub device obtains the encrypted public key information of the third electronic device from the cloud device.

S721: The public key information of the third electronic device that is obtained by the first hub device from the cloud is encrypted based on the fifth encryption key in S718. Therefore, the second electronic device may further send the public key information and the private key information of the second electronic device to the first hub device in a secure cloning (Secclone) manner, and the first hub device may generate the fifth decryption key based on the public key information and the private key information of the second electronic device. Optionally, in S721, the second electronic device may further encrypt the public key information and the private key information of the second electronic device based on a first shared key or a second shared key that is generated through negotiation with the first hub device, and then send encrypted public key information and encrypted private key information to the first hub device.

S722: After obtaining the public key information and the private key information of the second electronic device, the first hub device decrypts the obtained encrypted public key information of the third electronic device based on the fifth decryption key generated based on the public key information and the private key information of the second electronic device, to obtain the public key information of the third electronic device.

Steps S723 to S725 are similar to the steps S311 to S313 in the method 300. For descriptions of corresponding specific steps, refer to the descriptions of corresponding steps in S311 to S313 in the foregoing method 300. For brevity, details are not described herein again. A difference lies in that in S311 to S313, interaction is performed between the second electronic device (namely, the control station device in the method 300) and the first hub device, and in S723 to S725, interaction is performed between the third electronic device and the first hub device. In addition, in S723, a shared key generated through key negotiation between the first hub device and the third electronic device based on the public key information of the third electronic device and the public key information of the first electronic device is a third shared key. Other than that, specific steps are the same.

According to the key negotiation method provided in this application, when the user switches from the second electronic device to the third electronic device, to control the first electronic device, information sent by the user to the first electronic device is encrypted on the third electronic device based on the shared key, encrypted information is transmitted to the cloud device, and the cloud device forwards the encrypted information to the hub device. Because the cloud cannot learn the shared key, the cloud cannot learn the information, and cannot tamper with the information. In this way, security of information transmission is improved. After the user switches the control station device, accuracy of controlling the first electronic device by the user is ensured, and user experience is improved.

Figure 13:
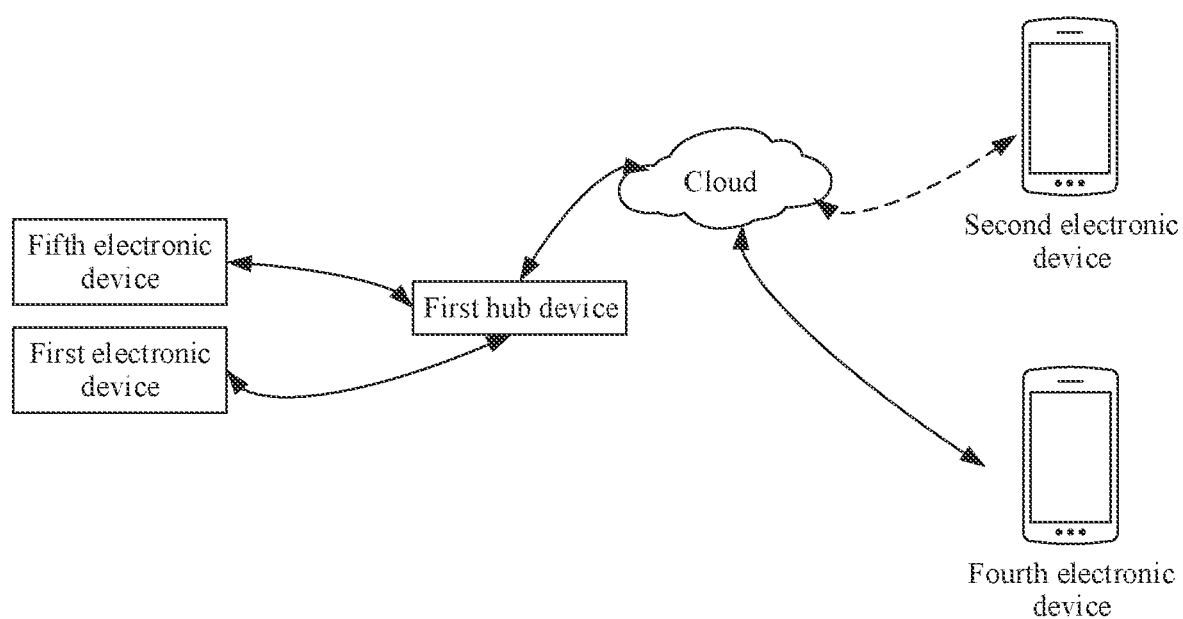
FIG. 13 is a schematic diagram of yet another example of a communication system applicable to an embodiment of this application according to an embodiment of this application.

In another possible implementation, FIG. 13 is a schematic diagram of yet another example of an architecture of a wireless communication system applicable to an embodiment of this application. As shown in FIG. 13, the hub device may manage a plurality of first electronic devices and fifth electronic devices. FIG. 13 shows a scenario in which there is one first electronic device and one fifth electronic device. In the example shown in FIG. 13, the control station device includes a primary control station device (a second electronic device) and a plurality of secondary control station devices (fourth electronic devices). FIG. 13 shows a scenario in which there is one secondary control station device. In an example shown in FIG. 13, the second electronic device (a primary control station device) and the fourth electronic device (a secondary control station device) correspond to the same account. Therefore, the second electronic device and the fourth electronic device separately correspond to the same public key information, and separately correspond to the same private key information.

Figure 14A:
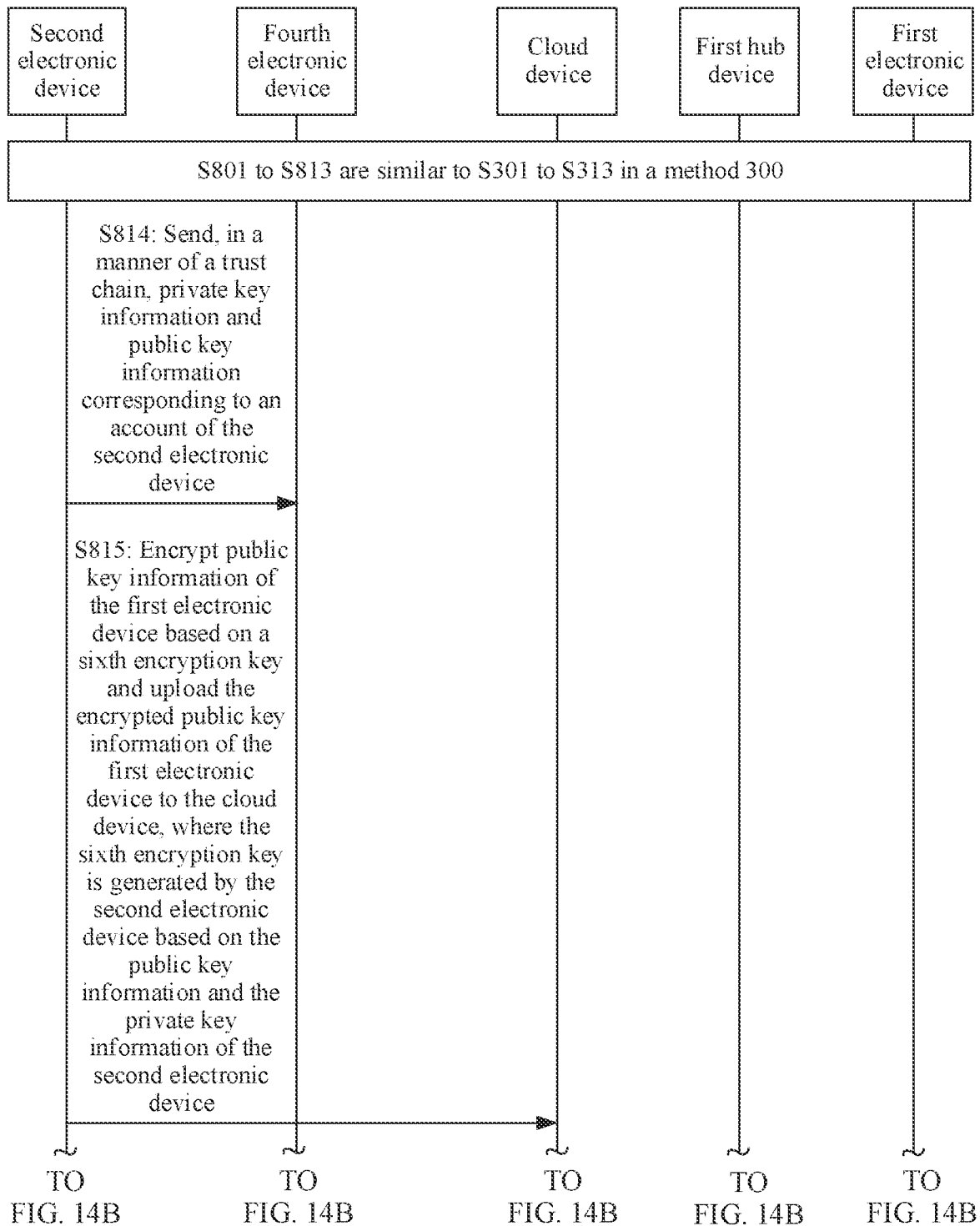
FIG. 14A and FIG. 14B are a schematic flowchart of still yet another example of a key negotiation method according to an embodiment of this application.
Figure 14B:
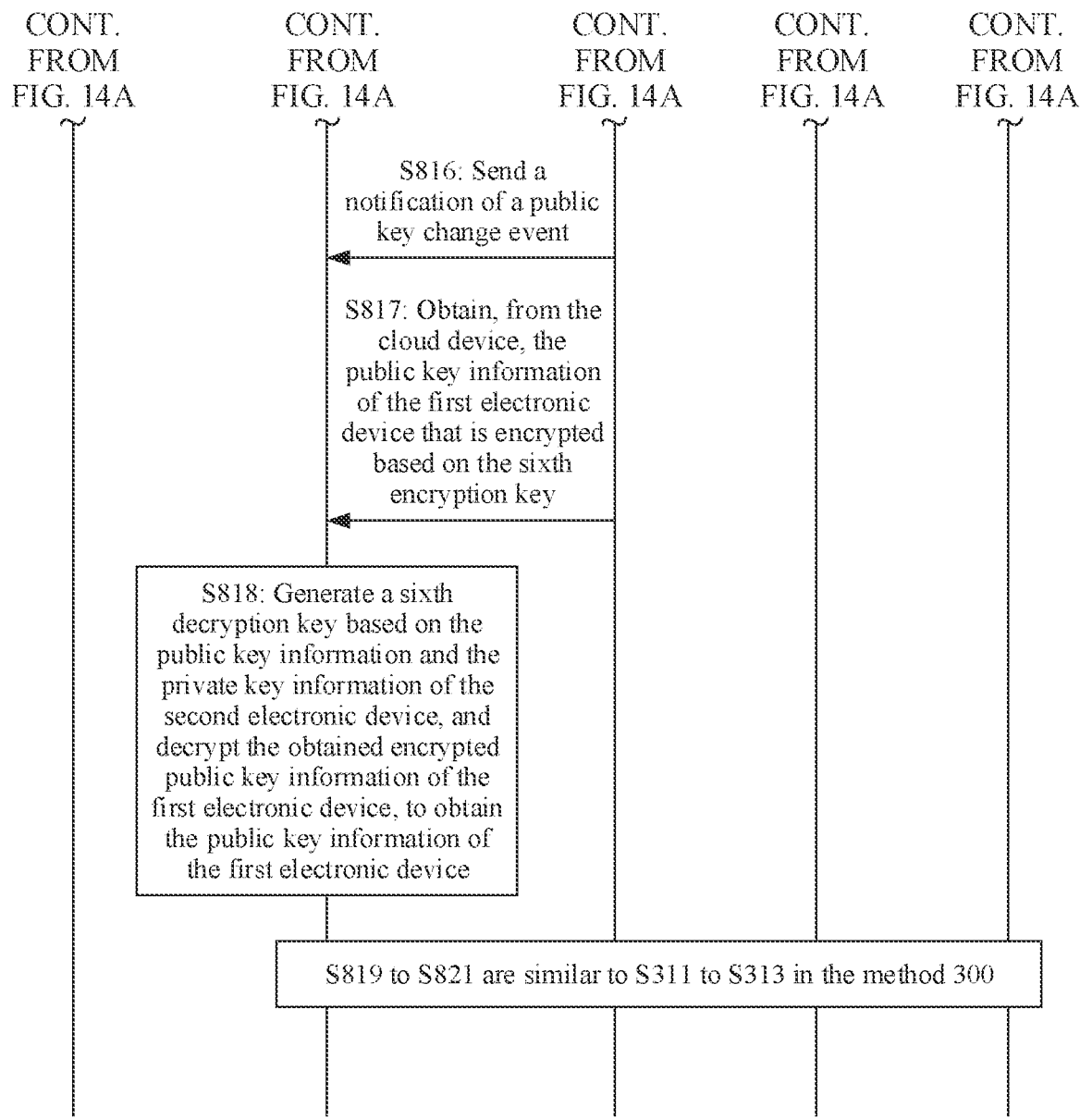

FIG. 14A and FIG. 14B are a schematic flowchart of a key negotiation method 800 provided in this application in the architecture shown in FIG. 13. As shown in FIG. 14A and FIG. 14B, the method 800 includes S801 to S821.

For descriptions of corresponding specific steps in S801 to S813, refer to the descriptions of corresponding steps in S301 to S313 in the foregoing method 300. For brevity, details are not described herein again.

S814: The second electronic device sends, to the fourth electronic device in a manner of a trust chain, private key information and public key information corresponding to an account of the second electronic device.

In S815, the second electronic device encrypts public key information of the first electronic device based on a sixth encryption key and uploads the encrypted public key information to a cloud device. The sixth encryption key is generated by the second electronic device based on the public key information and the private key information of the second electronic device.

In S816, public key information previously stored in the cloud device is the public key information of the second electronic device. After the second electronic device uploads the public key information of the first electronic device to the cloud device, the public key information stored in the cloud device changes. Therefore, the cloud device sends a notification of a public key change event to the fourth electronic device, to notify the fourth electronic device that the public key information stored in the cloud device changes.

In S817, after receiving the notification of the public key change event, the fourth electronic device obtains the encrypted public key information of the first electronic device from the cloud device.

In S818, the fourth electronic device generates a sixth decryption key based on the public key information and the private key information of the second electronic device, and decrypts the obtained encrypted public key information of the first electronic device, to obtain the public key information of the first electronic device.

Steps S819 to S821 are similar to the steps S311 to S313 in the method 700. For descriptions of corresponding specific steps, refer to the descriptions of corresponding steps in S311 to S313 in the foregoing method 300. For brevity, details are not described herein again. A difference lies in that in S311 to S313, interaction is performed between the second electronic device and the first hub device, and in S819 to S821, interaction is performed between the fourth electronic device and the first hub device. In addition, in S819, a shared key generated through negotiation between the first hub device and the fourth electronic device based on the public key information of the fourth electronic device and the public key information of the first electronic device is a fifth shared key. Other than that, specific steps are the same.

Optionally, in another possible implementation, in the method 800, in S814, the second electronic device may alternatively send the public key information of the first electronic device to the fourth electronic device in the manner of the trust chain, without uploading the public key information of the first electronic device to the cloud device, that is, if the second electronic device sends the public key information of the first electronic device to the fourth electronic device in the manner of the trust chain, the method 800 may not include S815 to S818.

It should be understood that, if the primary control station uploads the public key information of the first electronic device to the cloud device, when another fourth electronic device also needs to use the public key information of the first electronic device, the public key information of the first electronic device may be conveniently obtained from the cloud. This reduces complexity of obtaining the public key information of the first electronic device by another device. Further, because the manner of the trust chain is based on an account, and this is a manner of transmitting information related to the account between an APP on different devices if the APP on different devices have a same account, interaction between devices is not concerned in the manner of the trust chain. Because the first electronic device has no account, and the public key information of the first electronic device is not related to the account of the second electronic device, generally, if the second electronic device and the fourth electronic device correspond to the same account, the second electronic device generally does not send content irrelevant to the account in the manner of the trust chain, that is, the second electronic device uploads the public key information of the first electronic device to the cloud device, so that the fourth electronic device obtains the public key information from the cloud device.

In the scenario shown in FIG. 11 or FIG. 13, for the fifth electronic device, when the second electronic device shares the fifth electronic device managed by the hub with the fourth electronic device or the third electronic device for control, for a procedure of interaction between the fifth electronic device and each of the fourth electronic device and the third electronic device, refer to the descriptions of the specific procedure of the method 100 shown in FIG. 2A to FIG. 2C. The second electronic device shown in FIG. 2A to FIG. 2C is the fourth electronic device or the third electronic device. For brevity, details are not described herein again.

According to the key negotiation method provided in this application, in the process in which the first electronic device communicates with the second electronic device by using the hub device, the hub device replaces the first electronic device, to perform negotiation with the second electronic device, and replaces the first electronic device, to generate the key. The control command of the second electronic device for the first electronic device may be encrypted on the second electronic device based on the key, and encrypted control command is transmitted to the hub device by using the cloud. Because the cloud cannot learn the key, the cloud cannot learn the control command, and cannot tamper with the control command. In this way, security of the control command transmission between the second electronic device and the hub device is improved, accuracy of controlling the first electronic device by the user is ensured, and user experience is improved.

It should be further understood that the foregoing descriptions are merely intended to help a person skilled in the art better understand embodiments of this application, but are not intended to limit the scope of embodiments of this application. It is clear that a person skilled in the art may make various equivalent modifications or changes based on the foregoing examples. For example, some steps in the method 300 to the method 800 may be unnecessary, some steps may be newly added. Alternatively, any two or more of the foregoing embodiments are combined. A modified, changed, or combined solution also falls within the scope of embodiments of this application.

It should be further understood that division into the manners, cases, categories, and embodiments in embodiments of this application is merely intended for ease of description, and should not constitute a particular limitation. The features in the manners, categories, cases, and embodiments may be combined without contradiction.

It should be further understood that numerals used in embodiments of this application are differentiated merely for ease of description, but are not used to limit the scope of embodiments of this application. The sequence numbers of the foregoing processes do not mean execution sequences. The execution sequences of the processes should be determined according to functions and internal logic of the processes, and should not be construed as any limitation on the implementation processes of embodiments of this application.

It should be further understood that the foregoing descriptions of embodiments of this application emphasize differences between embodiments. For same or similar parts that are not mentioned, refer to embodiments. For brevity, details are not described herein again.

It should be further understood that in embodiments of this application, "predefinition" may be implemented by pre-storing corresponding code or a corresponding table in a device or in another manner that can be used to indicate related information. A specific implementation of "predefinition" is not limited in this application.

With reference to FIG. 1 to FIG. 14A and FIG. 14B, the foregoing describes embodiments of the key negotiation method provided in embodiments of this application. The following describes related devices provided in embodiments of this application.

In this embodiment, functional module division may be performed on each device (including the first hub device, the second hub device, the second electronic device, the third electronic device, and the fourth electronic device) according to the foregoing method. For example, each functional module may be obtained through division based on a corresponding function, or two or more functions may be integrated into one processing module. The integrated module may be implemented in a form of hardware. It should be noted that module division in this embodiment is an example and is merely logical function division. In actual implementation, there may be another division manner.

It should be noted that related content of all steps in the foregoing method embodiments may be cited in function description of corresponding functional modules. Details are not described herein again.

A communication apparatus (the first hub device, the second hub device, the second electronic device, the third electronic device, or the fourth electronic device) provided in this embodiment of this application is configured to perform the key negotiation method, and therefore can achieve the same effects as the foregoing implementation methods. When an integrated unit is used, the hub device may include a processing module, a storage module, and a communication module. The processing module may be configured to: control and manage an action of the hub device. For example, the processing module may be configured to support the hub device in performing steps performed by a processing unit. The storage module may be configured to support in storing program code, data, and the like. The communication module may be configured to support communication between the hub device and another device.

The processing module may be a processor or a controller. The processor may implement or execute various example logical blocks, modules, and circuits described with reference to content disclosed in this application. Alternatively, the processor may be a combination implementing a computing function, for example, a combination of one or more microprocessors, a combination of digital signal processor (digital signal processor, DSP) and a microprocessor, or the like. The storage module may be a memory. The communication module may be specifically a device, for example, a radio frequency circuit, a Bluetooth chip, a Wi-Fi chip, or the like that interacts with another electronic device.

Figure 15:
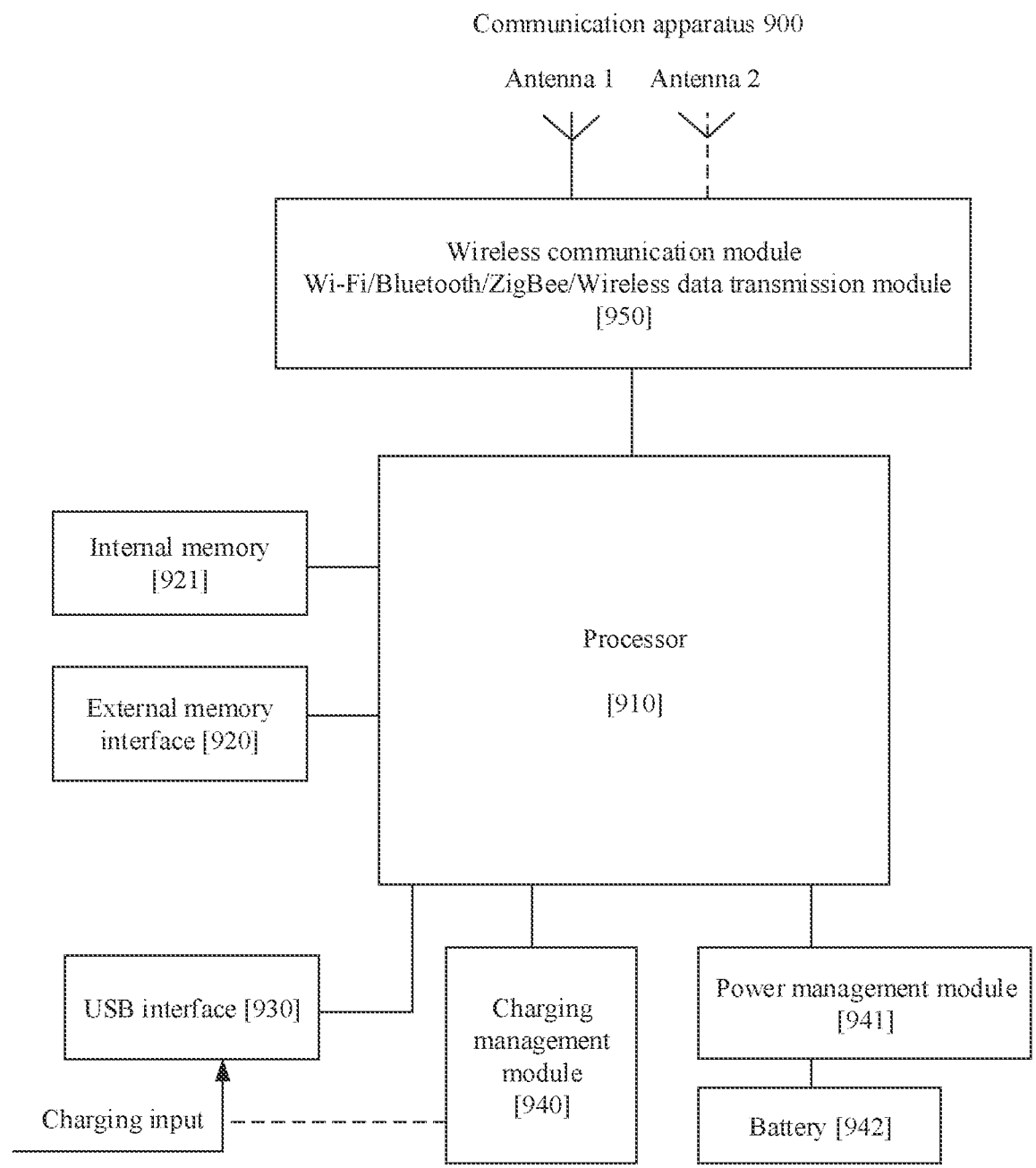
FIG. 15 is a schematic block diagram of an example of a structure of a hub device according to an embodiment of this application.

For example, FIG. 15 is a schematic diagram of an example of a hardware structure of a communication apparatus 900 according to this application. The communication apparatus 900 may be the first hub device, the second hub device, the second electronic device, the third electronic device, or the fourth electronic device. As shown in FIG. 15, the communication apparatus 900 may include a processor 910, an external memory interface 920, an internal memory 921, a universal serial bus (universal serial bus, USB) interface 930, a charging management module 940, a power management module 941, a battery 942, an antenna 1, an antenna 2, a wireless communication module 950, and the like.

It may be understood that, the structures shown in embodiments of this application do not constitute a specific limitation on the communication apparatus 900. In some other embodiments of this application, the communication apparatus 900 may include more or fewer components than those shown in the figure, or combine some components, or split some components, or have different component arrangements. The components shown in the figure may be implemented by hardware, software, or a combination of software and hardware.

The processor 910 may include one or more processing units. For example, the processor 910 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the communication apparatus 900 may alternatively include one or more processors 910. The controller may generate an operation control signal based on instruction operation code and a time sequence signal, to complete control of instruction reading and instruction execution.

In some embodiments, the processor 910 may include one or more interfaces. The interface may include an inter-integrated circuit (inter-integrated circuit, I2C) interface, an integrated circuit sound (integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface 930 is an interface that conforms to a USB standard specification, and may be specifically a mini USB interface, a micro USB interface, a USB type C interface, or the like. The USB interface 2530 may be configured to connect to a charger to charge the communication apparatus 900, or may be configured to transmit data between the communication apparatus 900 and a peripheral device.

It may be understood that, an interface connection relationship between the modules shown in this embodiment of this application is merely an example for description, and does not constitute a limitation on the structure of the communication apparatus 900. In some other embodiments of this application, the communication apparatus 900 may alternatively use an interface connection mode different from an interface connection mode in this embodiment, or a combination of a plurality of interface connection modes.

A wireless communication function of the communication apparatus 900 may be implemented by using the antenna 1, the antenna 2, the wireless communication module 950, and the like.

The wireless communication module 950 may provide a wireless communication solution that is applied to the communication apparatus 900 and that includes Wi-Fi (including Wi-Fi awareness and a Wi-Fi AP), Bluetooth (Bluetooth, BT), and a wireless data transmission module (for example, 433 MHz, 868 MHz, or 915 MHz). The wireless communication module 950 may be one or more components integrating at least one communication processor module. The wireless communication module 950 receives an electromagnetic wave through the antenna 1 or the antenna 2 (or the antenna 1 and the antenna 2), performs filtering and frequency modulation processing on an electromagnetic wave signal, and sends a processed signal to the processor 910. The wireless communication module 950 may further receive a to-be-sent signal from the processor 910, perform frequency modulation and amplification on the signal, and convert the signal into an electromagnetic wave for radiation through the antenna 1 or the antenna 2.

The external memory interface 920 may be used to connect to an external storage card, for example, a Micro SD card, to extend a storage capability of the communication apparatus 900. The external storage card communicates with the processor 910 through the external memory interface 920, to implement a data storage function. For example, files such as music and a video are stored in the external memory card.

The internal memory 921 may be configured to store one or more computer programs, and the one or more computer programs include instructions. The processor 910 may run the instructions stored in the internal memory 921, so that the communication apparatus 900 performs the key negotiation method provided in some embodiments of this application, various applications, data processing, and the like. The internal memory 921 may include a code storage area and a data storage area. The code storage area may store an operating system. The data storage area may store data created during use of the communication apparatus 900, and the like. In addition, the internal memory 921 may include a high-speed random access memory, or may include a nonvolatile memory, for example, one or more magnetic disk storage devices, a flash memory device, or a universal flash storage (universal flash storage, UFS). In some embodiments, the processor 910 may run the instructions stored in the internal memory 921 and/or instructions stored in the memory disposed in the processor 910, to enable the communication apparatus 900 to perform the key negotiation method provided in embodiments of this application, other applications, and data processing.

The communication apparatus 900 includes but is not limited to a routing device, for example, may be a wireless switch used in a wireless network, a Wi-Fi wireless router, an optical network terminal, a Wi-Fi wireless repeater or a CPE terminal, or a portable terminal hotspot. Alternatively, the communication apparatus 900 may be a device having a routing function, for example, may be a wireless router, a smart television, a large-screen device, a smart air conditioner, a mobile phone, a tablet computer, a notebook computer, a large-screen television, a smart home appliance, a PDA, a POS, a vehicle-mounted computer, a camera, a cordless phone, a PDA, a notebook computer, or a printer. This is not limited in this embodiment of this application.

It should be understood that, for a specific process in which the communication apparatus 900 performs the foregoing corresponding steps, refer to related descriptions of the steps performed by the second electronic device, the first hub device, the second hub device, the third electronic device, or the fourth electronic device described in embodiments in FIG. 5A to FIG. 5C, FIG. 6, FIG. 7, FIG. 9, FIG. 10A and FIG. 10B, FIG. 12A to FIG. 12C, and FIG. 14A and FIG. 14B. For brevity, details are not described herein again.

Figure 16:
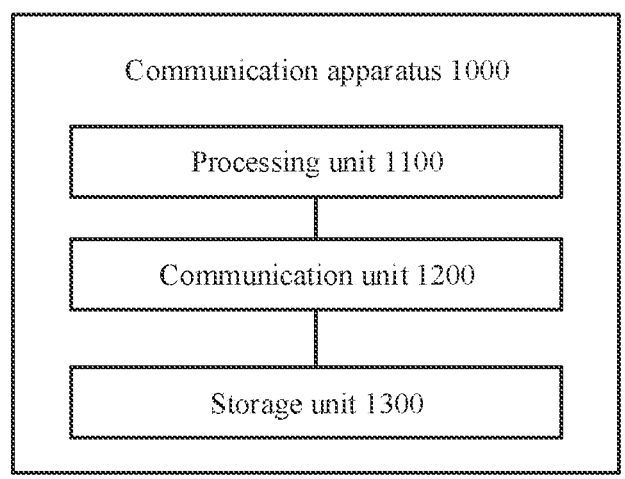
FIG. 16 is a schematic block diagram of an example of a structure of a communication apparatus according to an embodiment of this application.

FIG. 16 is a schematic block diagram of another example of a communication apparatus 1000 according to an embodiment of this application. The communication apparatus 1000 may correspond to the first hub device, the second hub device, the second electronic device, the third electronic device, or the fourth electronic device described in embodiments of the method 300 to the method 800. Alternatively, the communication apparatus 1000 may be a chip or component applied to the first hub device, the second hub device, the second electronic device, the third electronic device, or the fourth electronic device. In addition, modules or units of the communication apparatus 1000 are separately configured to perform actions or processing processes performed by the first hub device, the second hub device, the second electronic device, the third electronic device, or the fourth electronic device described in embodiments of the method 300 to the method 800. As shown in FIG. 16, the communication apparatus 1000 may include a processing unit 1100 and a communication unit 1200. Optionally, the communication apparatus 1000 may further include a storage unit 1300.

It should be understood that, for a specific process in which the units in the communication apparatus 1000 perform the foregoing corresponding steps, refer to related descriptions of the steps performed by the first hub device, the second hub device, the second electronic device, the third electronic device, or the fourth electronic device described in embodiments in FIG. 5A to FIG. 5C, FIG. 6. FIG. 7. FIG. 9, FIG. 10A and FIG. 10B, FIG. 12A to FIG. 12C, and FIG. 14A and FIG. 14B. For brevity, details are not described herein again.

Optionally, the communication unit 1200 may include a receiving unit (module) and a sending unit (module), which are configured to perform the steps of receiving information and sending information by the first hub device or the second hub device in the foregoing method embodiments. The storage unit 1300 is configured to store instructions executed by the processing unit 10($x$) and the communication unit 1200. The processing unit 1100 and the communication unit 1200 are connected to the storage unit 1300. The storage unit 1300 stores the instructions, the processing unit 1100 is configured to execute the instructions stored in the storage unit, and the communication unit 1200 is configured to execute specific receiving and sending of a signal when driven by the processing unit 1100.

It should be understood that the communication unit 1200 may be a transceiver, an input/output interface, an interface circuit, or the like, for example, may be implemented by the wireless communication module 950 in the embodiment shown in FIG. 15. The storage unit may be a memory, for example, may be implemented by the external memory interface 920 and the internal memory 921 in the embodiment shown in FIG. 15. The processing unit 1100 may be implemented by the processor 910, or may be implemented by the processor 910, the external memory interface 920, and the internal memory 921 in the embodiment shown in FIG. 15.

It should be further understood that the communication apparatus 1000 shown in FIG. 16 may be the first hub device, the second hub device, the second electronic device, the third electronic device, or the fourth electronic device, or the first hub device, the second hub device, the second electronic device, the third electronic device, or the fourth electronic device may include the communication apparatus 1000 shown in FIG. 16.

It should be further understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element. In an example, a unit in any one of the foregoing apparatuses may be one or more integrated circuits configured to implement the foregoing method, for example, one or more application-specific integrated circuits (application-specific integrated circuit, ASICs), one or more digital signal processors (digital signal processor, DSPs), one or more field programmable gate arrays (field programmable gate array, FPGAs), or a combination of at least two of these integrated circuit forms. For another example, when the units in the apparatus may be implemented in a form of scheduling a program by the processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

An embodiment of this application further provides a key negotiation system. The system includes the second electronic device, the first electronic device, the first hub device, and the cloud device provided in the foregoing method embodiments. Optionally, the system may further include at least one of the second hub device, the third electronic device, and the fourth electronic device provided in the foregoing method embodiments.

An embodiment of this application further provides a computer-readable storage medium, configured to store computer program code. The computer program includes instructions used to perform any key negotiation method provided in embodiments of this application. The readable medium may be a read-only memory (read-only memory, ROM) or a random access memory (random access memory. RAM). This is not limited in this embodiment of this application.

This application further provides a computer program product. The computer program product includes instructions. When the instructions are executed, the second electronic device, the first hub device, the second hub device, the third electronic device, or the fourth electronic device performs a corresponding operation in the foregoing method.

An embodiment of this application further provides a chip located in a communication apparatus. The chip includes a processing unit and a communication unit. The processing unit may be, for example, a processor, and the communication unit may be, for example, an input/output interface, a pin, or a circuit. The processing unit may execute computer instructions, so that the communication apparatus is enabled to perform any key negotiation method provided in the foregoing embodiments of this application.

Optionally, the computer instructions are stored in a storage unit.

Optionally, the storage unit is a storage unit inside the chip, such as a register or a cache. Alternatively, the storage unit may be a storage unit that is inside the terminal and that is located outside the chip, such as a ROM, another type of static storage device that can store static information and an instruction, or a random RAM. Any processor mentioned above may be a CPU, a microprocessor, an ASIC, or one or more integrated circuits used to control program execution of the feedback information transmission method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

The communication apparatus, the computer-readable storage medium, the computer program product, or the chip provided in embodiments is configured to perform a corresponding method provided above. Therefore, for beneficial effects that can be achieved by the communication apparatus, the computer storage medium, the computer program product, or the chip, refer to beneficial effects of the corresponding method provided above. Details are not described herein again.

It may be understood that the memory in this embodiment of this application may be a volatile memory or a nonvolatile memory, or may include a volatile memory and a nonvolatile memory. The non-volatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM, and serves as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM), and a direct rambus random access memory (direct rambus RAM, DR RAM).

In this application, names may be assigned to various objects such as messages/information/devices/network elements/systems/apparatuses/actions/operations/procedures/concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied/performed by the technical terms in the technical solutions.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the methods in embodiments of this application may be implemented by software, hardware, firmware, or any combination thereof. When software is used to implement embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, or another programmable apparatus. The computer programs or the instructions may be stored in the computer-readable storage medium, or may be transmitted through the computer-readable storage medium. The computer-readable storage medium may be any usable medium accessible by a computer, or a data storage device such as a server integrating one or more usable media.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a readable storage medium, and includes several instructions for instructing a computer device (which may be a personal computer, a server, or a network device) to perform all or some of the steps of the methods described in embodiments of this application. The foregoing readable storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A key negotiation method, comprising:
   generating, by a first hub device, public key information of a first electronic device and private key information of the first electronic device, wherein the first electronic device accesses a network by using the first hub device;
   reporting, by the first hub device, a first mode of the first electronic device to a cloud device, wherein the first mode comprises that the first electronic device supports a key negotiation capability;
   obtaining, by the first hub device, public key information of a second electronic device, wherein the public key information of the second electronic device is sent by the second electronic device based on the first mode of the first electronic device; and
   performing, by the first hub device, key negotiation with the second electronic device based on the private key information of the first electronic device and the public key information of the second electronic device, to generate a first shared key.

2. The key negotiation method according to claim 1, wherein the key negotiation method further comprises:
   sending, by the first hub device, the first shared key to the first electronic device.

3. The key negotiation method according to claim 2, wherein after the sending, by the first hub device, the first shared key to the first electronic device, the key negotiation method further comprises:
   receiving, by the first hub device, first information by using the cloud device, wherein the first information comprises information that is encrypted by the second electronic device based on the first shared key; and
   sending, by the first hub device, the first information to the first electronic device.

4. The key negotiation method according to claim 1, wherein the key negotiation method further comprises:
   receiving, by the first hub device, first information by using the cloud device, wherein the first information comprises information that is encrypted by the second electronic device based on the first shared key;
   decrypting, by the first hub device, the first information based on the first shared key, to obtain second information; and
   sending, by the first hub device, the second information to the first electronic device.

5. The key negotiation method according to claim 1, wherein before the generating, by a first hub device, public key information of a first electronic device and private key information of the first electronic device, the key negotiation method further comprises:
   receiving, by the first hub device, registration information sent by the first electronic device, wherein the registration information comprises a first identification code of the first electronic device, and information indicating that the first electronic device does not have the key negotiation capability.

6. The key negotiation method according to claim 5, wherein the obtaining, by the first hub device, public key information of a second electronic device comprises:
   performing, by the first hub device, key negotiation with the second electronic device based on the first identification code, to generate a second shared key;
   receiving, by the first hub device, the public key information of the second electronic device by using the cloud device, wherein the public key information of the second electronic device comprises information that is encrypted by the second electronic device based on the second shared key; and
   decrypting, by the first hub device, the public key information of the second electronic device based on the second shared key.

7. The key negotiation method according to claim 6, wherein the method further comprises:
   sending, by the first hub device, the public key information of the first electronic device to the second electronic device by using the cloud device, wherein the public key information of the first electronic device comprises information that is encrypted by the first hub device based on the second shared key.

8. The key negotiation method according to claim 7, wherein before the sending, by the first hub device, the public key information of the first electronic device to the second electronic device by using the cloud device, the key negotiation method further comprises:
   determining, by the first hub device based on first registration information, that the first electronic device does not have the key negotiation capability.

9. The key negotiation method according claim 1, wherein before the generating, by a first hub device, public key information of a first electronic device and private key information of the first electronic device, the key negotiation method further comprises:
   receiving, by the first hub device, a hub probe packet sent by the first electronic device; and
   sending, by the first hub device to the first electronic device, a response packet responding to the hub probe packet, wherein the response packet is used to enable the first electronic device to access the network by using the first hub device.

10. A hub device, comprising at least one processor and a one or more memories, wherein the one or more memories are coupled to the at least one processor and store programming instructions for execution by the at least one processor to perform following operations:
   generating public key information of a first electronic device and private key information of the first electronic device, wherein the first electronic device accesses a network by using the hub device;
   reporting a first mode of the first electronic device to a cloud device, wherein the first mode comprises that the first electronic device supports a key negotiation capability;
   obtaining public key information of a second electronic device, wherein the public key information of the second electronic device is sent by the second electronic device based on the first mode of the first electronic device; and
   performing key negotiation with the second electronic device based on the private key information of the first electronic device and the public key information of the second electronic device, to generate a first shared key.

11. A non-transitory computer-readable storage medium, wherein the non-transitory computer-readable storage medium stores programming instructions that, when executed by at least one processor, cause the at least one processor to perform operations comprising:
   generating public key information of a first electronic device and private key information of the first electronic device, wherein the first electronic device accesses a network by using first hub device;
   reporting a first mode of the first electronic device to a cloud device, wherein the first mode comprises that the first electronic device supports a key negotiation capability;
   obtaining public key information of a second electronic device, wherein the public key information of the second electronic device is sent by the second electronic device based on the first mode of the first electronic device; and
   performing key negotiation with the second electronic device based on the private key information of the first electronic device and the public key information of the second electronic device, to generate a first shared key.

12. The non-transitory computer-readable storage medium according to claim 11, wherein the non-transitory computer-readable storage medium stores the programming instructions that, when executed by the at least one processor, cause the at least one processor to perform operations comprising:
   sending the first shared key to the first electronic device.

13. The non-transitory computer-readable storage medium according to claim 12, wherein the non-transitory computer-readable storage medium stores the programming instructions that, when executed by the at least one processor, cause the at least one processor to perform operations comprising:
   after sending the first shared key to the first electronic device, receiving first information by using the cloud device, wherein the first information comprises information that is encrypted by the second electronic device based on the first shared key; and
   sending the first information to the first electronic device.

14. The non-transitory computer-readable storage medium according to claim 11, wherein the non-transitory computer-readable storage medium stores the programming instructions that, when executed by the at least one processor, cause the at least one processor to perform operations comprising:
   receiving first information by using the cloud device, wherein the first information comprises information that is encrypted by the second electronic device based on the first shared key;
   decrypting the first information based on the first shared key, to obtain second information; and
   sending the second information to the first electronic device.

15. The non-transitory computer-readable storage medium according to claim 11, wherein the non-transitory computer-readable storage medium stores the programming instructions that, when executed by the at least one processor, cause the at least one processor to perform operations comprising:
   before generating the public key information of the first electronic device and the private key information of the first electronic device, receiving registration information sent by the first electronic device, wherein the registration information comprises a first identification code of the first electronic device, and information indicating that the first electronic device does not have the key negotiation capability.

16. The non-transitory computer-readable storage medium according to claim 15, wherein the obtaining public key information of a second electronic device comprises:
   performing key negotiation with the second electronic device based on the first identification code, to generate a second shared key;
   receiving the public key information of the second electronic device by using the cloud device, wherein the public key information of the second electronic device comprises information that is encrypted by the second electronic device based on the second shared key; and
   decrypting the public key information of the second electronic device based on the second shared key.

17. The non-transitory computer-readable storage medium according to claim 16, wherein the non-transitory computer-readable storage medium stores the programming instructions that, when executed by the at least one processor, cause the at least one processor to perform operations comprising:
   sending the public key information of the first electronic device to the second electronic device by using the cloud device, wherein the public key information of the first electronic device comprises information that is encrypted by the first hub device based on the second shared key.

18. The non-transitory computer-readable storage medium according to claim 17, wherein the non-transitory computer-readable storage medium stores the programming instructions that, when executed by the at least one processor, cause the at least one processor to perform operations comprising:
   before sending the public key information of the first electronic device to the second electronic device by using the cloud device, determining, based on first registration information, that the first electronic device does not have the key negotiation capability.

19. The non-transitory computer-readable storage medium according to claim 11, wherein the non-transitory computer-readable storage medium stores the programming instructions that, when executed by the at least one processor, cause the at least one processor to perform operations comprising:

before generating the public key information of the first electronic device and the private key information of the first electronic device, receiving a hub probe packet sent by the first electronic device; and sending to the first electronic device, a response packet responding to the hub probe packet, wherein the response packet is used to enable the first electronic device to access the network by using the first hub device.

* * * * *